US009269268B2

(12) United States Patent
Bowers et al.

(10) Patent No.: US 9,269,268 B2
(45) Date of Patent: Feb. 23, 2016

(54) SYSTEMS AND METHODS FOR ADAPTIVE VEHICLE SENSING SYSTEMS

(71) Applicant: Elwha, LLC, Bellevue, WA (US)

(72) Inventors: Jeffrey A. Bowers, Issaquah, WA (US); Geoffrey F. Deane, Bellevue, WA (US); Russell J. Hannigan, Sammamish, WA (US); Roderick A. Hyde, Redmond, WA (US); Muriel Y. Ishikawa, Livermore, CA (US); Nathan Kundtz, Kirkland, WA (US); Nathan P. Myhrvold, Bellevue, WA (US); David R. Smith, Durham, NC (US); Philip A. Sullivan, Bozeman, MT (US); Clarence T. Tegreene, Bellevue, WA (US); David B. Tuckerman, Lafayette, CA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 177 days.

(21) Appl. No.: 13/956,203

(22) Filed: Jul. 31, 2013

(65) Prior Publication Data

US 2015/0035687 A1 Feb. 5, 2015

(51) Int. Cl.
*G08G 1/01* (2006.01)
*G08G 1/16* (2006.01)
*B60Q 9/00* (2006.01)

(52) U.S. Cl.
CPC ............... *G08G 1/166* (2013.01); *B60Q 9/008* (2013.01); *G08G 1/161* (2013.01); *G08G 1/164* (2013.01); *G08G 1/165* (2013.01)

(58) Field of Classification Search
CPC . G01S 13/72; G01S 13/867; G01S 13/93316; G01S 2013/9353; G08G 1/166; G08G 1/165; G08G 1/164; G08G 1/161; B60Q 9/008
USPC .................. 340/435, 436, 933, 943, 937, 942; 342/70; 701/300, 301
See application file for complete search history.

(56) References Cited

U.S. PATENT DOCUMENTS

| 6,087,928 | A | 7/2000 | Kleinberg et al. |
| 6,141,611 | A | 10/2000 | Mackey et al. |
| 6,223,125 | B1 | 4/2001 | Hall |
| 6,246,933 | B1 | 6/2001 | Bagué |

(Continued)

FOREIGN PATENT DOCUMENTS

WO WO 03/001474 A2 1/2003

OTHER PUBLICATIONS

PCT International Search Report; International App. No. PCT/US13/49583; Sep. 4, 2013; pp. 1-2.

(Continued)

*Primary Examiner* — Anh V La

(57) ABSTRACT

An adaptive sensing system is configured to acquire sensor data pertaining to objects in the vicinity of a land vehicle. The adaptive sensing system may be configured to identify objects that are at least partially obscured by other objects and, in response, the adaptive sensing system may be configured to modify the configuration of one or more sensors to obtain additional information pertaining to the obscured objects. The adaptive sensing system may comprise and/or be communicatively coupled to a collision detection module, which may use the sensor data acquired by the adaptive sensing system to detect potential collisions.

44 Claims, 11 Drawing Sheets

(56) References Cited

U.S. PATENT DOCUMENTS

| | | |
|---|---|---|
| 6,295,502 B1 | 9/2001 | Hancock et al. |
| 6,438,472 B1 | 8/2002 | Tano et al. |
| 6,445,983 B1 | 9/2002 | Dickson et al. |
| 6,487,500 B2 | 11/2002 | Lemelson et al. |
| 6,573,831 B2 | 6/2003 | Ikeda et al. |
| 6,615,137 B2 | 9/2003 | Lutter et al. |
| 6,630,884 B1 | 10/2003 | Shanmugham |
| 6,643,578 B2 | 11/2003 | Levine |
| 6,950,013 B2 | 9/2005 | Scaman et al. |
| RE38,870 E | 11/2005 | Hall |
| 6,969,287 B1 | 11/2005 | Motsenbocker |
| 7,000,721 B2 | 2/2006 | Sugawara et al. |
| 7,124,027 B1 | 10/2006 | Ernst, Jr. et al. |
| 7,633,383 B2 | 12/2009 | Dunsmoir et al. |
| 7,859,392 B2 | 12/2010 | McClellan et al. |
| 8,031,085 B1 | 10/2011 | Anderson |
| 8,180,514 B2 | 5/2012 | Kaprielian et al. |
| 8,352,110 B1 | 1/2013 | Szybalski et al. |
| 8,352,111 B2 | 1/2013 | Mudalige |
| 8,508,353 B2 | 8/2013 | Cook et al. |
| 8,630,768 B2 | 1/2014 | McClellan et al. |
| 2001/0033661 A1 | 10/2001 | Prokoski |
| 2001/0034573 A1 | 10/2001 | Morgan et al. |
| 2002/0010935 A1 | 1/2002 | Sitnik |
| 2002/0041240 A1 | 4/2002 | Ikeda et al. |
| 2002/0097193 A1 | 7/2002 | Powers |
| 2002/0111725 A1 | 8/2002 | Burge |
| 2002/0174360 A1 | 11/2002 | Ikeda |
| 2002/0198632 A1 | 12/2002 | Breed et al. |
| 2003/0014176 A1 | 1/2003 | Levine |
| 2003/0093220 A1 | 5/2003 | Andersson et al. |
| 2003/0149530 A1 | 8/2003 | Stopczynski |
| 2003/0158758 A1 | 8/2003 | Kanazawa et al. |
| 2003/0171865 A1 | 9/2003 | Moser et al. |
| 2004/0021853 A1 | 2/2004 | Stam et al. |
| 2004/0085198 A1 | 5/2004 | Saito et al. |
| 2004/0139034 A1 | 7/2004 | Farmer |
| 2004/0153362 A1 | 8/2004 | Bauer et al. |
| 2004/0189512 A1* | 9/2004 | Takashima et al. ............. 342/70 |
| 2004/0199327 A1 | 10/2004 | Isogai et al. |
| 2004/0233045 A1 | 11/2004 | Mays |
| 2005/0065682 A1 | 3/2005 | Kapadia et al. |
| 2005/0065711 A1 | 3/2005 | Dahlgren et al. |
| 2005/0104721 A1 | 5/2005 | Mae et al. |
| 2005/0125117 A1 | 6/2005 | Breed |
| 2006/0089790 A1 | 4/2006 | Dupuis |
| 2006/0208169 A1 | 9/2006 | Breed et al. |
| 2006/0212195 A1 | 9/2006 | Veith et al. |
| 2006/0213359 A1 | 9/2006 | Vitale et al. |
| 2006/0271258 A1 | 11/2006 | Salmeen et al. |
| 2007/0018877 A1 | 1/2007 | Bailey |
| 2007/0055553 A1 | 3/2007 | Kwan |
| 2007/0088488 A1 | 4/2007 | Reeves et al. |
| 2007/0219720 A1 | 9/2007 | Trepagnier et al. |
| 2007/0225912 A1 | 9/2007 | Grush |
| 2007/0287473 A1 | 12/2007 | Dupray |
| 2008/0027591 A1 | 1/2008 | Lenser et al. |
| 2008/0033604 A1 | 2/2008 | Margolin |
| 2008/0065401 A1 | 3/2008 | Abrahamson |
| 2008/0097699 A1 | 4/2008 | Ono |
| 2008/0114530 A1 | 5/2008 | Petrisor et al. |
| 2008/0221776 A1 | 9/2008 | McClellan |
| 2008/0243378 A1 | 10/2008 | Zavoli |
| 2008/0252487 A1 | 10/2008 | McClellan et al. |
| 2008/0255722 A1 | 10/2008 | McClellan et al. |
| 2008/0258890 A1 | 10/2008 | Follmer et al. |
| 2008/0262670 A1 | 10/2008 | McClellan et al. |
| 2008/0294690 A1 | 11/2008 | McClellan et al. |
| 2008/0320036 A1 | 12/2008 | Winter |
| 2009/0051510 A1 | 2/2009 | Follmer et al. |
| 2009/0073537 A1* | 3/2009 | Taverner ....................... 359/260 |
| 2009/0109037 A1 | 4/2009 | Farmer |
| 2009/0157566 A1 | 6/2009 | Grush |
| 2009/0174573 A1 | 7/2009 | Smith |
| 2009/0212974 A1 | 8/2009 | Chiba et al. |
| 2009/0292467 A1 | 11/2009 | McNelis et al. |
| 2009/0299547 A1 | 12/2009 | Becker et al. |
| 2009/0327066 A1 | 12/2009 | Flake et al. |
| 2010/0039313 A1 | 2/2010 | Morris |
| 2010/0097208 A1 | 4/2010 | Rosing et al. |
| 2010/0106344 A1 | 4/2010 | Edwards et al. |
| 2010/0106356 A1 | 4/2010 | Trepagnier et al. |
| 2010/0131303 A1 | 5/2010 | Collopy et al. |
| 2010/0131307 A1 | 5/2010 | Collopy et al. |
| 2010/0131308 A1 | 5/2010 | Collopy et al. |
| 2010/0138244 A1 | 6/2010 | Basir |
| 2010/0141518 A1 | 6/2010 | Hersey et al. |
| 2010/0164789 A1 | 7/2010 | Basnayake |
| 2010/0214085 A1 | 8/2010 | Avery et al. |
| 2010/0250021 A1 | 9/2010 | Cook et al. |
| 2010/0256836 A1 | 10/2010 | Mudalige |
| 2010/0262364 A1 | 10/2010 | Ikeda |
| 2010/0271256 A1 | 10/2010 | Tsunekawa |
| 2010/0332266 A1 | 12/2010 | Tamir et al. |
| 2011/0010023 A1 | 1/2011 | Kunzig et al. |
| 2011/0029185 A1 | 2/2011 | Aoki et al. |
| 2011/0106442 A1 | 5/2011 | Desai et al. |
| 2011/0122026 A1 | 5/2011 | DeLaquil et al. |
| 2011/0130913 A1 | 6/2011 | Duggan et al. |
| 2011/0161244 A1 | 6/2011 | Iyer et al. |
| 2011/0169625 A1 | 7/2011 | James et al. |
| 2011/0254708 A1 | 10/2011 | Anderson |
| 2011/0266076 A1 | 11/2011 | Morey et al. |
| 2011/0267205 A1 | 11/2011 | McClellan et al. |
| 2011/0270476 A1 | 11/2011 | Doppler et al. |
| 2011/0285571 A1 | 11/2011 | Jeong et al. |
| 2011/0307139 A1 | 12/2011 | Caminiti et al. |
| 2012/0028680 A1 | 2/2012 | Breed |
| 2012/0044066 A1 | 2/2012 | Mauderer et al. |
| 2012/0050089 A1 | 3/2012 | Gurevich et al. |
| 2012/0072051 A1 | 3/2012 | Koon et al. |
| 2012/0078498 A1 | 3/2012 | Iwasaki et al. |
| 2012/0083960 A1 | 4/2012 | Zhu et al. |
| 2012/0101921 A1 | 4/2012 | Anderson et al. |
| 2012/0106786 A1* | 5/2012 | Shiraishi et al. ............. 382/103 |
| 2012/0109446 A1 | 5/2012 | Yousefi et al. |
| 2012/0166229 A1 | 6/2012 | Collins et al. |
| 2012/0173290 A1 | 7/2012 | Collins et al. |
| 2012/0242540 A1 | 9/2012 | Feller |
| 2012/0249341 A1 | 10/2012 | Brown et al. |
| 2012/0268235 A1 | 10/2012 | Farhan et al. |
| 2012/0271500 A1 | 10/2012 | Tsimhoni et al. |
| 2012/0296539 A1 | 11/2012 | Cooprider et al. |
| 2013/0093582 A1 | 4/2013 | Walsh et al. |
| 2013/0145482 A1 | 6/2013 | Ricci et al. |
| 2013/0187792 A1 | 7/2013 | Egly |
| 2013/0253816 A1 | 9/2013 | Caminiti et al. |
| 2013/0279491 A1 | 10/2013 | Rubin et al. |
| 2013/0293974 A1 | 11/2013 | Hartmann |
| 2014/0002252 A1 | 1/2014 | Fong et al. |

OTHER PUBLICATIONS

PCT International Search Report; International App. No. PCT/US2013/049571; Sep. 17, 2013; pp. 1-2.

PCT International Search Report; International App. No. PCT/US2013/049579; Sep. 24, 2013; pp. 1-2.

Li et al.; "Multi-user Data Sharing in Radar Sensor Networks"; SenSys-07 Proceedings of the 5th International conference on Embedded networked sensor systems; Nov. 2007; pp. 247-260; ACM Digital Library; Landon IP Inc.; retrieved from: http://none.cs.umas.edu/papers/pdf/SenSys07-Utility.pdf.

Zhu et al.; U.S. Appl. No. 61/391,271; Oct. 8, 2010; 3 pages.

Extended European Search Report; European App. No. EP 13 75 2024; bearing a date of Jul. 30, 2015; pp. 1-6.

* cited by examiner

SYSTEMS AND METHODS FOR ADAPTIVE VEHICLE SENSING SYSTEMS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

RELATED APPLICATIONS

U.S. patent application Ser. No. 13/956,204, entitled SYSTEMS AND METHODS FOR ADAPTIVE VEHICLE SENSING SYSTEMS, naming Jeffrey A. Bowers, Geoffrey F. Deane, Russell J. Hannigan, Roderick A. Hyde, Muriel Y. Ishikawa, Nathan Kundtz, Nathan P. Myhrvold, David R. Smith, Philip A. Sullivan, Clarence T. Tegreene, David B. Tuckerman, and Lowell L. Wood, Jr. as inventors, filed Jul. 31, 2013, is related to the present application.

U.S. patent application Ser. No. 13/956,200, entitled SYSTEMS AND METHODS FOR ADAPTIVE VEHICLE SENSING SYSTEMS, naming Jeffrey A. Bowers, Geoffrey F. Deane, Russell J. Hannigan, Roderick A. Hyde, Muriel Y. Ishikawa, Nathan Kundtz, Nathan P. Myhrvold, David R. Smith, Philip A. Sullivan, Clarence T. Tegreene, David B. Tuckerman, and Lowell L. Wood, Jr. as inventors, filed Jul. 31, 2013, is related to the present application.

U.S. patent application Ser. No. 13/544,757, entitled SYSTEMS AND METHODS FOR COOPERATIVE COLLISION DETECTION, naming Jeffrey A. Bowers et al. as inventors, filed Jul. 9, 2012, is related to the present application.

U.S. patent application Ser. No. 13/544,770, entitled SYSTEMS AND METHODS FOR COORDINATING SENSOR OPERATION FOR COLLISION DETECTION, naming Jeffrey A. Bowers et al. as inventors, filed Jul. 9, 2012, is related to the present application.

U.S. patent application Ser. No. 13/544,799, entitled SYSTEMS AND METHODS FOR VEHICLE MONITORING, naming Jeffrey A. Bowers et al. as inventors, filed Jul. 9, 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates to vehicle-based sensing systems and, in particular, to systems and methods for adaptive vehicle sensing systems.

SUMMARY

An adaptive sensing system may be configured to modify the configuration of one or more sensors in response to determining that a first object is at least partially obscured by a second object. Alternatively, or in addition, the adaptive sensing system may modify the configuration of the one or more sensors in response to determining that one or more regions within a detection range of the sensors are obscured by one or more other objects. Modifying the configuration of the adaptive sensing system may comprise directing sensing signals to the first object (and/or obscured areas). The signals may be directed by use of one or more other objects. Directing the signals may comprise repositioning one or more of the sensors. The adaptive sensing system may be configured to redirect sensing signals in response to detecting a vehicle that is positioned in front of the vehicle. The redirected sensing signals may be configured to look-ahead of the other vehicle (e.g., detect one or more other vehicles that are in front of the vehicle). The sensing signals may be redirected around, above, and/or below the vehicle. In some embodiments, the redirected sensing signals are configured to reflect and/or bounce off of a road surface and/or other object.

DETAILED DESCRIPTION

Figure 1A:
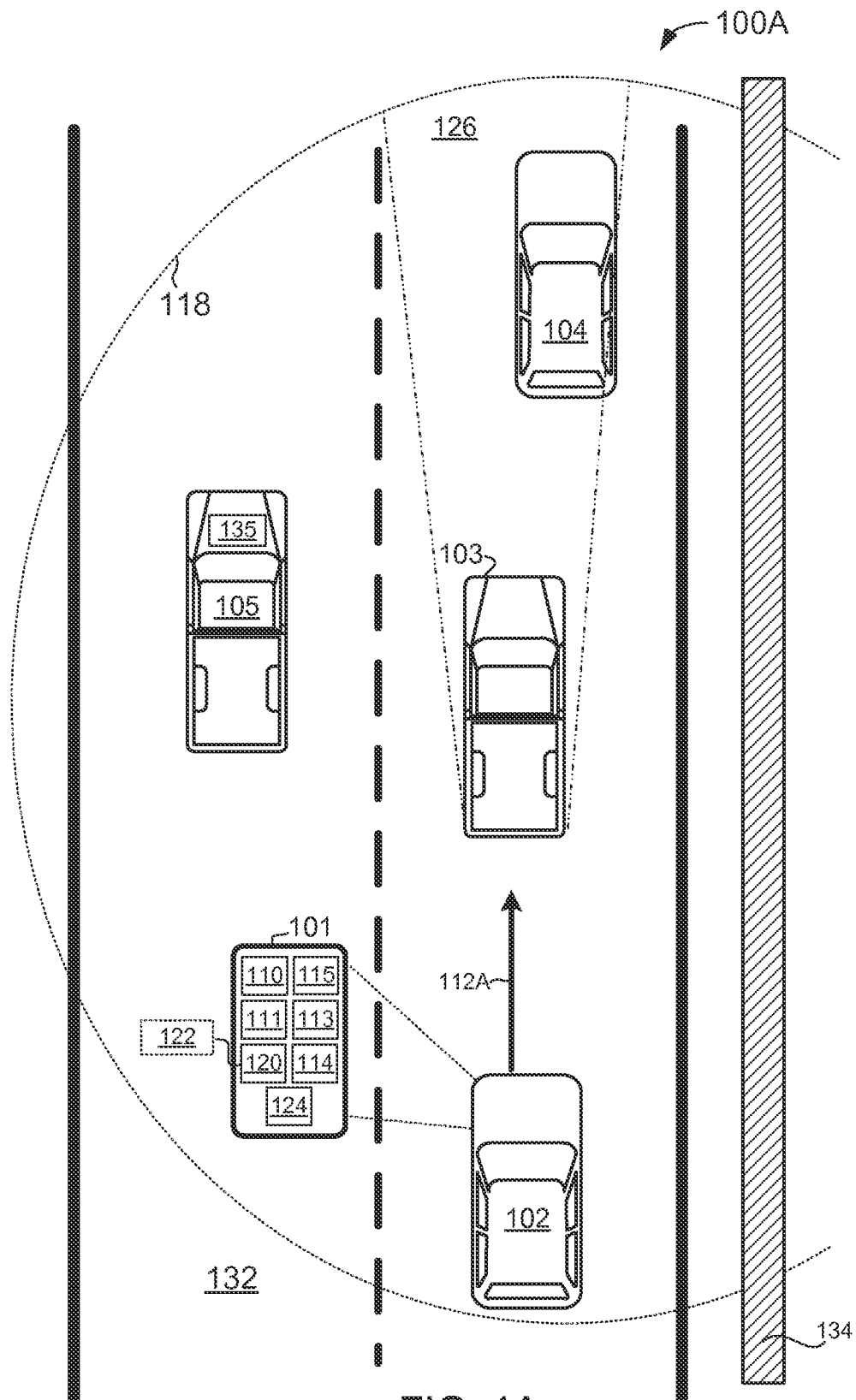
FIG. 1A is a block diagram depicting a system comprising one embodiment of an adaptive sensing system.

As disclosed herein, a land vehicle may comprise a sensing system configured to acquire sensor data pertaining to other objects. The objects may include, but are not limited to: other vehicles (e.g., cars, trucks, trailers, motorcycles, and so on), cargo, pedestrians, animals, road hazards, debris, road features (e.g., bridges, supports, barriers, and so on), and/or the like. The data acquired by the sensing system may be used to determine properties of one or more objects, which may include, but are not limited to: object kinematics, object orientation, object position, and so on. The acquired sensor data may indicate that a first object is at least partially obscured by a second object. In response, the sensing system of the land vehicle may be reconfigured to acquire sensor data pertaining to the first object. Reconfiguring the sensor system may comprise modifying the configuration of one or more sensors and/or repositioning one or more sensors.

In some embodiments, the adaptive sensing system may comprise and/or be communicatively coupled to a collision detection module configured to detect potential collisions involving the vehicle and/or other objects by use of, inter alia, the sensor data acquired by the adaptive sensing system. Detecting potential collisions may comprise generating a collision detection model. As used herein, a "collision detection model" refers to a kinematic object model of objects in a vicinity of the vehicle. The collision detection model may, therefore, comprise object position, velocity, acceleration, orientation, size, and so on. In some embodiments, the collision detection model further comprises object weight estimates, maneuverability estimates, and so on. The collision detection model may comprise kinematics of objects relative to a particular frame of reference, such as relative position, velocity, acceleration, closing rate, orientation, and so on. The collision detection model may be translated between frames of reference for use in different vehicles. The collision detection model may be generated, in part, on the vehicle. Alternatively, the collision detection model (and/or portions thereof) may be generated by other vehicles.

The disclosed embodiments of adaptive sensing systems may be further configured to store monitoring data on a persistent storage device. As used herein, "monitoring data" may include, but is not limited to: sensor data acquired by the adaptive sensing system, the configuration of the adaptive sensing system (and/or individual sensors of the adaptive sensing system), information pertaining to the operation of the vehicle (e.g., operator inputs, location, speed, and so on), information pertaining to other objects, a collision detection model, and the like. In some embodiments, monitoring data may be stored on a persistent, non-transitory storage device of the land vehicle. Alternatively, or in addition, the monitoring data may be transmitted on a communication network to, inter alia, one or more network-accessible services. The monitoring data may be secured, such that the authenticity and/or source of the monitoring data can be verified.

A network accessible service may be configured to aggregate monitoring data from a plurality of vehicles. The network-accessible service may index and/or arrange monitoring data by time, location, vehicle identity, or the like. The network-accessible service may provide access to the monitoring data to one or more requesters via the network. Access to the monitoring data may be predicated on consideration, such as a payment, bid, reciprocal access (to monitoring data of the requester), or the like.

FIG. 1A is a block diagram 100 depicting one embodiment of an adaptive sensing system 101. The adaptive sensing system 101 may be deployed within a ground vehicle 102, such as a car, truck, bus, train, or the like. The adaptive sensing system 101 may comprise a computing device, and as such, may include processing resources 111 and computer-readable storage resources 113. The processing resources 111 may include, but are not limited to: general-purpose processing units, central processing units (CPUs), special-purpose processing units, application-specific integrated circuits (ASICs), programmable logic elements, field programmable gate arrays (FPGAs), and/or the like. Portions of the systems, modules, agents, methods, processes and/or operations disclosed herein may be configured to operate on the processing resources 111. The adaptive sensing system 101 may further comprise computer-readable storage resources 113, which may include, but are not limited to: volatile memory resources, random access memory (RAM), persistent storage resources, non-transitory computer-readable storage resources, and/or the like.

The adaptive sensing system 101 may be configured to acquire sensor data pertaining to objects within a detection range 118 of the vehicle 102 by use of one or more sensors 110. The sensors 110 may comprise active and/or passive sensing devices, which may include, but are not limited to, one or more electro-magnetic sensing systems (e.g., radar sensing systems, phased array sensing systems, metamaterial sensing systems, metamaterial surface antenna sensing systems such as the MSA-T systems developed by Kymeta Corporation, etc.), electro-optical (EO) sensing systems (e.g., laser sensing system, Light Detection and Ranging (LIDAR) systems, etc.), acoustic sensing systems, ultrasonic sensing systems, magnetic sensing systems, imaging systems (e.g., cameras, image processing systems, stereoscopic cameras, etc.), kinetic and/or motion sensors (e.g., to detect and/or compensate for road vibrations, perturbations, etc.), and the like. The adaptive sensing system 101 may further comprise sensors 110 for determining the kinematics of the vehicle 102 (e.g., "self-knowledge" regarding the vehicle 102). Accordingly, the sensors 110 may include, and/or be communicatively coupled to, information gathering devices of the vehicle 102 such as vehicle control inputs (e.g., steering inputs, brake inputs, etc.), speedometers, accelerometers, gyroscopes, Global Positioning System (GPS) receivers, wireless network interfaces, and/or the like.

The adaptive sensing system 101 may be capable of acquiring information pertaining to objects within a detection range 118. As used herein, a "detection range" refers to a range at which the adaptive sensing system 101 is capable of acquiring (and/or configured to acquire) object information. In some embodiments, the detection range 118 may be more limited than the maximum detection range of the adaptive sensing system 101 (the maximum range at which the sensors 110 of the adaptive sensing system 101 can reliably acquire object information). The detection range 118 may be set by user configuration and/or may be determined automatically based upon operating conditions of the vehicle 102, such as vehicle velocity and/or direction, velocity of other objects, weather conditions, and so on. The adaptive sensing system 101 may reduce the detection range 118 in response to the vehicle 102 traveling at a low velocity and may expand the detection range 118 in response to the vehicle 102 traveling at higher velocities. Similarly, the detection range 118 may be based upon the kinematics of other objects in the vicinity of the vehicle 102. In some embodiments, the adaptive sensing system 101 may expand the detection range 118 in response to detecting another vehicle 103 travelling at a high velocity relative to the vehicle 102, even though the vehicle 102 is traveling at a low velocity.

In some embodiments, the adaptive sensing system 101 may comprise directional sensors 110 (e.g., a beam forming radar, phased array, etc.). The sensor management module 114 may be configured to shape and/or direct the detection range 118 of the adaptive sensing system 101 in response to operating conditions. In some embodiments, the adaptive sensing system 101 may direct the detection range 118 toward the front of the vehicle 102 when the vehicle 102 is travelling forward at a high velocity; when the vehicle 102 is turning, the detection range 118 may be steered in the direction of the turn; and so on. The adaptive sensing system 101 may comprise a data acquisition module 115 configured to coordinate operation of the sensors 110 to acquire sensor data. The data acquisition module 115 may be configured to operate the sensors 110 according to a current sensor configuration as determined by, inter alia, the sensor management module 114 (described in further detail herein).

The adaptive sensing system 101 may further comprise a processing module 120, configured to process sensor data acquired by use of the data acquisition module 115 (by use of the sensors 110). The processing module 120 may be configured to generate a "kinematic model" or "collision detection model" 122 using the sensor data. As used herein, a "collision detection model" 122 refers to modeling data pertaining to objects in the vicinity of the land vehicle 102. The collision detection model 122 may include various information about the objects, such as object size, position, orientation, velocity, acceleration (e.g., closing rate), angular extent, angle-dependent range, and so on. The collision detection model 122 may comprise kinematics relative to the vehicle 102 (e.g., relative velocity, acceleration, and so on). Alternatively, the collision detection model 122 may incorporate the kinematics of the vehicle 102 and/or may be defined in another frame of reference (e.g., GPS position, frame of reference of another vehicle 103, 104, or the like). The collision detection model 122 may further comprise information pertaining to current operating conditions, such as road conditions, visibility, and so on. For example, the collision detection model 122 may comprise information pertaining to the condition of the operating surface (e.g., roadway), such as whether the roadway is muddy, wet, icy, snowy, or the like. The processing module 120 may use current operating condition information to estimate the probability (and/or ability) of objects to maneuver to, inter alia, avoid potential collisions (e.g., turn, decelerate, and so on).

The system 100A may further comprise a collision detection module 124 configured to detect potential collisions using, inter alia, the sensor data acquired by use of the adaptive sensing system 101 and/or the collision detection model 122. The collision detection module 124 may be configured to identify potential collisions based on the kinematics of objects in the vicinity of the vehicle 102. In some embodiments, the collision detection model 122 may further comprise predictive information. For example, the collision detection model 122 may comprise estimates of object size, weight, and so on. The predictive information may be used to determine object momentum and other characteristics, which may be used to determine a potential result of a collision (e.g., object kinematics after a potential collision has occurred).

The collision detection model 122 may further comprise collision avoidance information, which may comprise instructions on how to avoid potential collisions detected by the collision detection module 124. The collision avoidance information may pertain to the vehicle 102 and/or other vehicles 103, 104, and/or 105. The collision avoidance information may further comprise information to allow the vehicle 102 to avoid becoming involved in collision(s) involving other vehicles (e.g., avoid a potential result of a collision between vehicles 103 and 105).

The collision detection module 124 may use the collision detection model 122 to extrapolate and/or predict object kinematics, which may indicate potential object collisions (e.g., object intersections within the collision detection model 122), the time to a potential collision, impact velocity of the potential collision, forces involved in a potential collision, a potential result of a collision, and so on.

In some embodiments, the processing module 120 may be configured to identify objects that are at least partially obscured by other objects and/or identify areas that are not fully covered by the adaptive sensing system 101. As illustrated in FIG. 1A, the vehicle 104 may be partially obscured by the vehicle 103. The sensors 110 may be configured to operate in a first configuration, which may comprise transmitting detection signal(s) 112A from one or more of the sensors 110. The position of the vehicle 103 and/or configuration of the sensors 110 may create a sensor system "shadow" or "blind spot" resulting in an obscured area 126. As used herein, an obscured area 126 refers to an area or 3-D region in which one or more detection signal(s) 112A of the adaptive sensing system 101 are at least partially blocked, absorbed, diffused, reflected, and/or obscured by other objects (e.g., the vehicle 103). The obscured area 126 may be different for different types and/or configurations of the sensors 110 of the adaptive sensing system 101. For example, electro-optical LIDAR sensing signal may be completely blocked by portions of the vehicle 103, whereas other sensing signals, such as certain types of RF signals, may be capable of passing through portions of the vehicle 103.

In some embodiments, the processing module 120 may be configured to identify objects that are at least partially obscured by other objects (e.g., objects in a shadow of a current configuration of the adaptive sensing system 101).

The adaptive sensing system 101 may be configured to identify obscured objects by one or more of: a) identifying shadows by use of the collision detection model, b) periodically and/or continuously modifying a configuration of the sensors 110, c) coordination with other sensing systems, d) acquiring partial sensor data pertaining to obscured objects, and/or the like. In response to detecting an object that is at least partially obscured by another object, the sensor management module 114 may modify the configuration of the sensors 110 in order to, inter alia, acquire additional sensor data pertaining to the obscured object(s).

In some embodiments, the processing module 120 may be configured to model obscured areas 126 of the adaptive sensing system 101 based on: a) the current configuration of the sensors 110 and/or b) objects in the collision detection model 122. In the FIG. 1A embodiment, the processing module 120 may be configured to identify the obscured area 126 based on the position, size, and/or orientation of the vehicle 103 and the current configuration of the sensors 110. In response, the processing module 120 may generate alternative configurations of the sensors 110 that are configured to modify and/or change the configuration of the obscured area 126. The sensor management module 114 may reconfigure the sensors 110 accordingly, which may enable the sensors 110 to acquire sensor data pertaining to objects within the obscured area 126.

Alternatively, or in addition, identifying obscured objects may comprise periodically or continuously modifying the configuration of the sensors 110 to "sweep" different regions in the vicinity of the vehicle. In other embodiments, obscured objects may be identified in response to receiving partial sensor data pertaining to the object.

As disclosed in further detail herein, in some embodiments, the adaptive sensing system 101 may be configured to coordinate with other sensing systems 135 in order to, inter alia, identify objects that are within the obscured area 126 of the current configuration of the adaptive sensing system 101 and/or acquire sensor data pertaining to obscured objects (by use of the data acquisition module 115). In the FIG. 1A embodiment, the sensing system 135 of vehicle 105 may be capable of detecting the vehicle 104 and/or acquiring sensor data pertaining to the vehicle 104. The adaptive sensing system 101 may be configured to coordinate with the sensing system 135 to identify the vehicle 104 in the obscured area 126 and/or to acquire sensor data pertaining to the vehicle 104.

As illustrated in FIG. 1A, a portion of the vehicle 104 may be outside of the obscured area 126 of the sensors 110. Accordingly, the sensors 110 may receive at least some sensor data pertaining to the obscured vehicle 104. The sensor data may correspond to only a subset of the sensors 110 (e.g., the sensors 110 that are not blocked by the vehicle 103). Moreover, the sensor data pertaining to the obscured vehicle 104 acquired by the adaptive sensing system 101 may have a low signal-to-noise ratio (SNR) and/or artifacts due to signal blockage, reflection, diffusion, and/or absorption by the vehicle 103. The processing module may use sensor data corresponding to unobscured portions of vehicle 104 to infer (e.g., from a database of vehicle models and dimensions) data pertaining to obscured portions of vehicle 104, such as its physical extent, its orientation, its velocity, or the like. The processing module 120 may denote portions of the obscured area 126 which are not occupied by inferred portions of vehicle 104 as uncharacterized portions, and may designate such portions for further sensor examination. In some embodiments, the adaptive sensing system 101 may configure one or more of the sensors 110 to acquire sensor information pertaining to the obscured area 126 and/or the uncharacterized portions of the obscured area 126. The processing module 120 may use sensor data pertaining to the vehicle 104 to distinguish the vehicle 104 from the obscuring object(s) (e.g., the vehicle 103) and/or to determine a modified sensor configuration to acquire additional sensor data pertaining to the vehicle.

In the FIG. 1A embodiment, the adaptive sensing system 101 may be capable of acquiring unobstructed sensor data pertaining to the vehicle 103. Accordingly, the processing module 120 may be capable of accurately modeling the vehicle 103 in the collision detection model 122. Modeling data pertaining to the vehicle 103 may comprise the kinematics of the vehicle 103, the position of the vehicle 103, an orientation of the vehicle 103, a size of the vehicle 103, dimensions of the vehicle 103 (e.g., height, width, ground clearance, etc.), vehicle configuration (e.g., windows, mirrors, etc.), an estimate of the weight of the vehicle 103, and so on. In some embodiments, the model may further include signal propagation properties of the vehicle 103, such as signal transmission, attenuation, reflectance, absorption, and so on. As disclosed herein, the signal propagation properties of the vehicle 103 may be used to direct detection signal(s) to objects within the obscured area 126.

The acquired sensor data may further comprise sensor data pertaining to the obscured vehicle 104. The sensor data pertaining to the vehicle 104, however, may be incomplete and/or inaccurate (e.g., may correspond to only a sub-set of the sensors 110, have a low SNR, and/or the like). Accordingly, the model of the vehicle 104 may be incomplete and/or inaccurate. However, the processing module 120 may be capable of determining that a vehicle is in the obscured area 126 (and/or is obscured by the vehicle 103) using the partial, lossy sensor data. The processing module 120 may distinguish the vehicle 104 based on kinematics (e.g., differing velocity, acceleration, and so on), (e.g., based on differential velocities detected by Doppler sensors). The processing module 120 may distinguish the vehicle 104 based on position and/or range (e.g., based on sensor data acquired by use of a camera, RADAR and/or LIDAR sensor 110). A camera system may determine range as well as angular information, by use of depth-of-focus or stereoscopic techniques. The processing module 120 may distinguish the vehicle 104 based on time-of-flight of one or more of the sensing signals 112A, return properties of the sensing signals 112A (e.g., return phase, absorption, polarization, color or spectral distribution, and/or the like), and so on.

In response to identifying the obscured area 126 of the current configuration of the adaptive sensing system 101 and/or acquiring sensor data pertaining to a vehicle within the obscured area 126 (e.g., an object that is at least partially obscured by another object), the adaptive sensing system 101 may modify the configuration of one or more of the sensors 110 in order to acquire additional sensor data pertaining to object(s) within the obscured area 126. As used herein, modifying the configuration of the sensors 110 may include, but is not limited to: modifying detection signal(s) 112A generated by one or more of the sensors 110; directing the detection signal(s) 112A; modifying a group and/or collection of sensors 110 (e.g., beamforming, spatial filtering, and/or the like); modifying the configuration of one or more signal detectors; repositioning one or more sensors 110; repositioning one or more signal emitters and/or detectors; and/or the like. Modifying the detection signal(s) 112A may comprise modifying a wavelength, frequency, phase, polarization, amplitude, power, and/or direction of the detection signal(s) 112A. Modifying the configuration of one or more signal detectors of the sensors 110 may comprise modifying a signal gain, filtering, time-gating, and/or the like.

As disclosed above, modifying the configuration of the sensors 110 may comprise directing sensing signals of one or more of the sensors 110 to the obscured object and/or to the obscured area 126. Referring to the system 100B of FIG. 1B, the processing module 120 may determine that the vehicle 104 is obscured by the vehicle 103 (e.g., is in the obscured area 126) in response to receiving partial, low-SNR sensor data acquired by the sensors 110 operating in a first configuration. In response, the processing module 120 may determine a signal path between the sensors 110 and obscured vehicle 104. The signal path may correspond to a line-of-sight path between one or more of the sensors and the vehicle.

In some embodiments, the signal path may comprise directing one or more sensing signals to the obscured vehicle 104 by use of one or more other objects such as the road surface 132, a roadway structure 134, other vehicle(s) (e.g., the vehicle 105), and/or the like. The sensor management module 114 may be configured to direct one or more sensing signals 112B to pass underneath the vehicle 103. The sensing signals 112B may be configured to bounce and/or reflect from the road surface 132 towards the obscured vehicle 104. In some embodiments the direction and/or the polarization of sensing signals may be configured to increase reflectance from the road surface 132. In some embodiments the direction or polarization sensitivity of an antenna may be configured to increase reception SNR of return signals reflected from road surface 132. Accordingly, determining the signal path to/from the obscured vehicle 103 may comprise determining and/or estimating the dimensions and/or configuration of the object(s) that are obscuring the vehicle 104 (e.g., determining a height and/or clearance of the vehicle 103).

Alternatively, or in addition, the sensing signals 112B may be configured to pass through portions of the vehicle 103. Portions of the vehicle 103 may allow transmission of particular types of sensing signals 112B. For example, non-metallic and/or non-ferrous portions (e.g., windows) of the vehicle 103 may allow transmission of EO, RF, and/or LIDAR signals. The processing module 120 may be configured to identify portions of the vehicle 103 through which one or more of the sensing signals 112B can pass, and may configure a signal path accordingly. Determining the signal path may, therefore, comprise scanning and/or modeling other objects (e.g., the vehicle 103). The processing module 120 may be further configured to determine properties of the signal path, such as reflectance, absorption, and/or the like. For example, windows of the vehicle 103 may be tinted and/or polarized; the sensor management module 114 may configure the sensing signals 112B with a wavelength, frequency, phase, polarization, and/or amplitude to enable the sensing signals 112B to pass through the windows.

In another embodiment, the processing module 120 may be configured to direct sensing signals 112B over the vehicle 103. As disclosed above, the processing module 120 may be configured to determine and/or model the configuration of the vehicle 103. Based on the model of the vehicle 103, sensor management module 114 may determine a signal path in which one or more sensing signals 112B pass over the vehicle 103 toward the obscured vehicle 104. The processing module 120 may analyze sensor data acquired by use of the modified sensing signals 112B to determine whether the redirected sensing signals 112B also passed over the obscured vehicle 104. If so, the processing module 120 may instruct the sensor management module 114 to reconfigure the sensors 110 to direct the sensing signals 112B to the obscured vehicle 104 via a different signal path, as disclosed herein.

The processing module 120 may be configured to direct one or more sensing signals 112C around the obscuring object(s) (e.g., vehicle 103). As disclosed above, a portion of the vehicle 104 may be outside of the obscured area 126. As such, the processing module 120 may identify a signal path between the sensors 110 and the obscured vehicle 104 that passes to the side of the vehicle 103.

In other embodiments, the processing module 120 may direct sensing signals 112D to the obscured vehicle 104 by use of a road structure such as a road barrier 134 (e.g., a wall, bridge, guardrail, jersey barrier, or the like). The sensor management module 114 may be configured to direct the sensors to bounce and/or reflect sensing signals 112D from the road barrier 134 to the obscured vehicle 104. The sensor management module 114 may be further configured to adapt the sensing signals 112D in accordance with signal propagation properties (e.g., frequency or polarization reflectivity dependence) of the road barrier 134. The sensor management module 114 may configure signal wavelength, frequency, phase, polarization, amplitude, power, and/or the like to ensure that the sensing signals 112D are capable of reaching the vehicle 104.

In another embodiment, the processing module 120 may direct sensing signals 112E to the obscured vehicle 104 by use of another vehicle, such as the vehicle 105. The signal path of the sensing signals 112E may comprise bouncing and/or reflecting the sensing signals 112E from a side of the vehicle 105. The sensor management module 114 may configure the sensing signals 112E in accordance with signal propagation properties (e.g., frequency or polarization reflectivity dependence) of the vehicle 105, as disclosed above.

In some embodiments, directing the sensing signals 112A, 112B, 112C, 112D, and/or 112E on the signal paths determined by the processing module 120 may comprise configuring one or more directional signal emitters and/or detectors (e.g., directional antenna). Alternatively, or in addition, adaptive sensing system 101 may comprise an array of sensors 110 (e.g., a phased array). Accordingly, the sensor management module 114 may be configured to direct the sensing signals 112A, 112B, 112C, 112D, and/or 112E using one or more of: beamforming, filtering, spatial filtering, time-gating filtering, and/or the like.

Figure 1B:
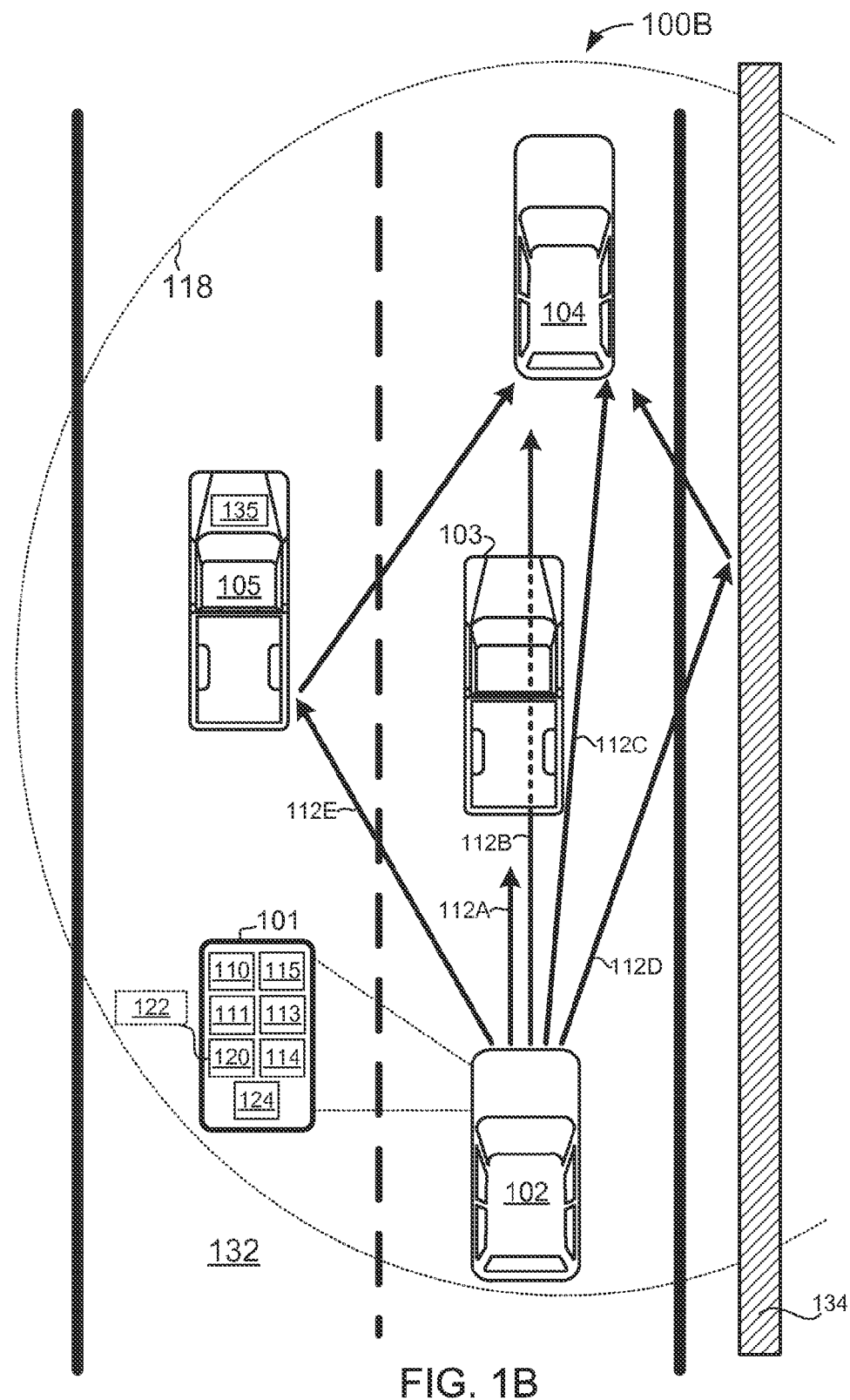
FIG. 1B is a block diagram depicting a system comprising another embodiment of an adaptive sensing system.
Figure 1C:
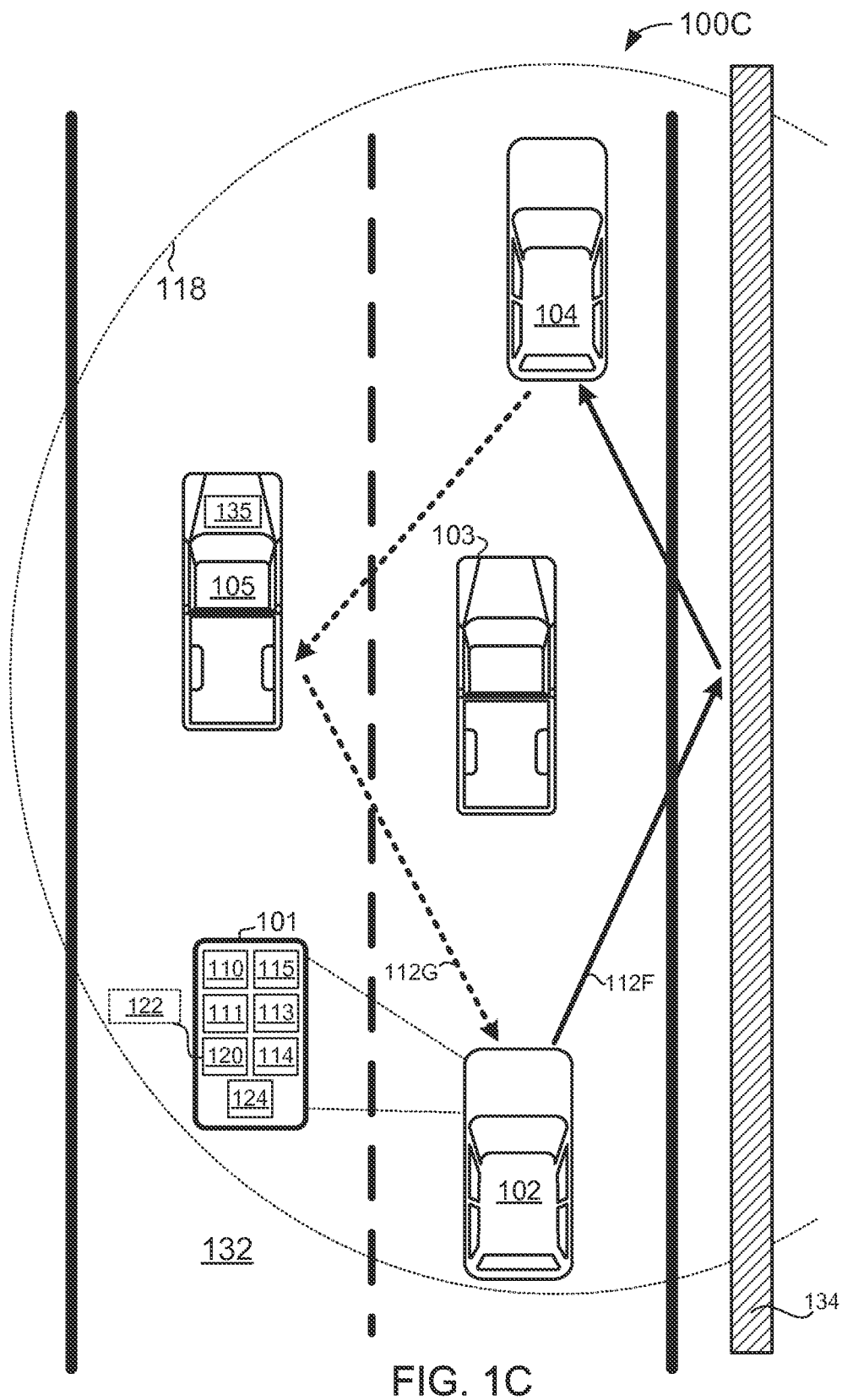
FIG. 1C is a block diagram depicting a system comprising another embodiment of an adaptive sensing system.

Referring to the system 100C of FIG. 1C, the signal path(s) determined by the processing module 120 may be further configured to direct one or more return sensing signals to the adaptive sensing system 101. The signal path(s) may, therefore, comprise a) a signal path configured to direct the detection signal(s) 112F to the vehicle 104, and/or b) a return signal path configured to direct return detection signal(s) 112G back to the adaptive sensing system 101. As illustrated in FIG. 1C, the sensing signals 112F may be directed to/from the obscured object via a different signal path than the return sensing signals 112G. The sensing signals 112F may be directed to the vehicle 104 by use of the road barrier 134, and the return sensing signals 112G may be directed back to the adaptive sensing system 101 by use of the vehicle 105. The processing module 120 may be configured to determine signal propagation properties of both signal path(s) and the sensor management module 114 may configure the sensing signals 112F accordingly.

The signal paths disclosed in conjunction with FIGS. 1B-1C may be dependent on a plurality of dynamic factors, such as the position of one or more other vehicles (e.g., vehicle 105), road structures 134, and so on. Accordingly, the processing module 120 may be configured to periodically and/or continuously monitor the signal paths to/from the obscured vehicle 104 (using the collision detection model 122) and adjust the signal paths accordingly. The sensor management module 114 may be configured to modify the configuration of the sensors 110 in accordance with modifications to the signal paths.

Figure 1D:
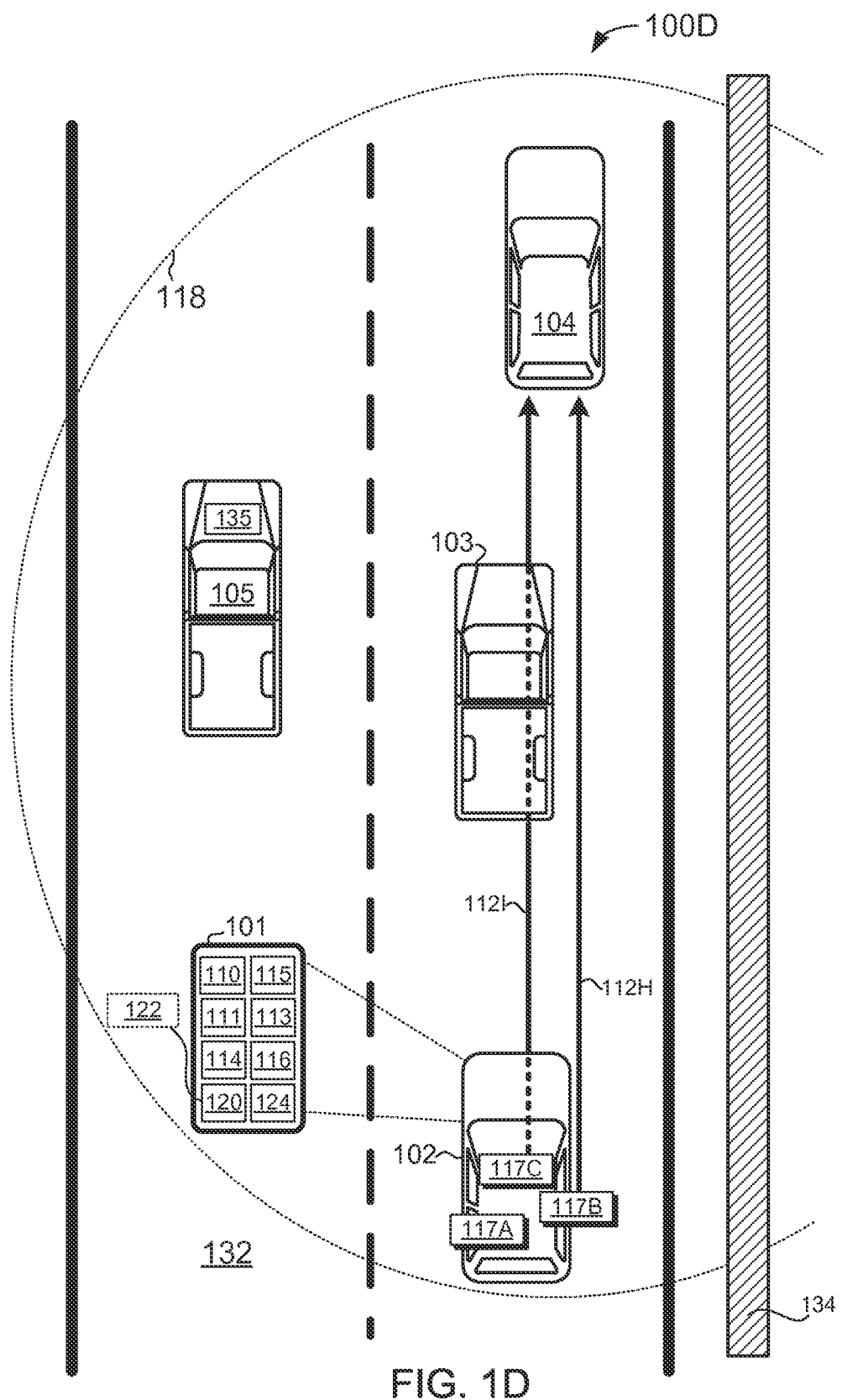
FIG. 1D is a block diagram depicting a system comprising another embodiment of an adaptive sensing system.

Referring to system 100D of FIG. 1D, in some embodiments, the adaptive sensing system 101 may be configured to change the position and/or location of one or more of the sensors 110 by use of, inter alia, a sensor positioning module 116. The sensor positioning module 116 may comprise one or more motion mechanisms capable of moving and/or repositioning one or more of the sensors 110. Changing the position of a sensor 110 may comprise repositioning one or more emitters and/or detectors of the sensor 110. The sensor positioning module 116 may comprise one or more motion mechanisms, tracks, support racks, motors, servos, actuators, booms, meta-materials, configurable materials, and/or the like. The sensor positioning module 116 may be capable of moving one or more sensors 110 to/from particular locations 117A-C on the vehicle 102. The different locations and/or positions 117A-C may be configured to provide different signal emission and/or detection locations on the vehicle 102. As illustrated in FIG. 1D, the sensor management module 114 may configure the sensor positioning module 116 to move one or more sensors 110 from position 117A to position 117B. The sensors 110 at position 117B may have an unobstructed signal path to/from the vehicle 104. Accordingly, sensing signals 112H emitted by the sensors 110 at position 117B may propagate around the vehicle 103 directly to/from the vehicle 104. The position 117B may be on a side of the vehicle 102 and/or may extend beyond the edge of the vehicle 102 (e.g., on a boom, extension member, rack mount, and/or the like).

In another embodiment, the sensor positioning module 116 may be configured to modify the height of one or more of the sensors 110 relative to the vehicle 102. The position 117C may comprise lowering one or more sensors 110 below its nominal location on the vehicle 102. The decreased height may give the sensors 110 at position 117C an unobstructed signal path to the vehicle 104; the sensing signals 112I may propagate under the vehicle 103 to/from the vehicle 104. The sensors 110 may be lowered to the 117C by use of a retractable boom, support rack, antenna, and/or the like. The position 117C may comprise raising one or more sensors 110 above a roof of the vehicle 102. The increased height may give the sensors 110 at position 117C an unobstructed signal path to the vehicle 104; the sensing signals 112I may propagate over the vehicle 103 to/from the vehicle 104. The sensors 110 may be raised to the 117C by use of a retractable boom, support rack, antenna, and/or the like. Alternatively, or in addition, the sensors 110 may be repositioned by use of signal redirection members, such as waveguides, mirrors, and/or the like. In such embodiments, the signal emitters and/or detectors may remain in place (and/or may move a limited amount), while the sensing signals 112H and/or 112I generated thereby are propagated from various locations 117A-C relative to the vehicle 102 by use of movable signal direction members.

The adaptive sensing system 101 may be configured to acquire sensor data using the repositioned sensors, as disclosed herein. In response to acquiring the sensor data, the processing module 120 may generate the collision detection model 122 and the collision detection module 124 may use the collision detection model 122 to detect potential collisions, as disclosed herein.

The collision detection module 124 may be further configured to take one or more actions in response to detecting a potential collision. Such actions may include, but are not limited to: alerting the operator of the vehicle 102 to the potential collision, determining a collision avoidance action, determining a collision mitigation action, determining a potential result of the collision (e.g., estimate object kinematics after the collision), determining actions to avoid the potential result, automatically taking one or more collision avoidance actions, transmitting the collision detection model 122 to other vehicles (and/or a portion thereof), coordinating a response to the potential collision with other vehicles, contacting an emergency services entity, and so on.

Alternatively, or in addition, the collision detection module 124 may comprise (or be communicatively coupled to) a control system of the vehicle 102. As used herein, a vehicle "control system" refers to a system for providing control inputs to a vehicle 102, such as steering, braking, acceleration, and so on. The collision detection module 124 may incorporate portions of the vehicle control system, such as a sensor for determining velocity, acceleration, braking performance (e.g., an anti-lock braking system), and the like. The collision detection module 124 may be further configured to monitor control system inputs to predict changes to vehicle kinematics (e.g., predict changes to acceleration based upon operator control of accelerator and/or braking inputs).

As disclosed above, the collision detection model 122 derived from the sensor data acquired by use of the adaptive sensing system 101 may comprise kinematic information that may be expressed using any suitable coordinate system and/or frame of reference. Accordingly, kinematic information may be represented as component values, vector quantities, or the like, in a Cartesian coordinate system, a polar coordinate system, or the like. Furthermore, kinematic information may be relative to a particular frame of reference; for example, kinematic information may comprise object orientation, position, velocity, acceleration (e.g., closing rate), and so on relative to an orientation, position, velocity, and/or acceleration of a particular vehicle 102, 103, 104, and/or 105.

Figure 1E:
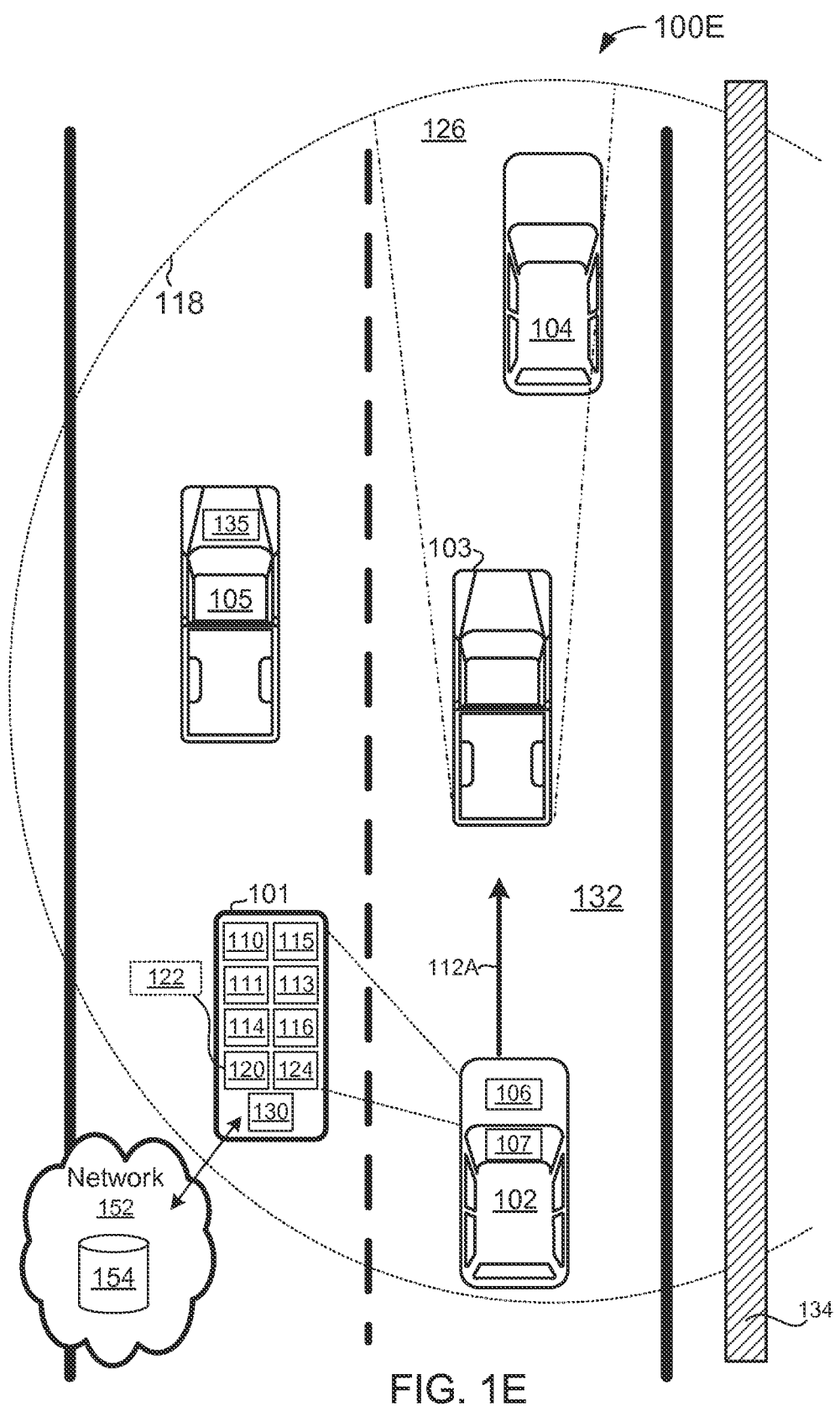
FIG. 1E is a block diagram depicting a system comprising another embodiment of an adaptive sensing system.

Referring to system 100E of FIG. 1E, in some embodiments, the adaptive sensing system 101 may coordinate operation with other sensing systems by use of, inter alia, a communication module 130. The communication module 130 may include, but is not limited to, one or more: wireless network interfaces, cellular data interfaces, satellite communication interfaces, electro-optical network interfaces (e.g., infrared communication interfaces), and/or the like. The communication module 130 may be configured to communicate in point-to-point "ad-hoc" networks and/or infrastructure networks 152, such as an Internet Protocol network (e.g., the Internet, a local area network, a wide area network, or the like).

As depicted in FIG. 1E, the position of vehicle 103 may create a sensor obscured area 126 that, in some configurations, may prevent the adaptive sensing system 101 from reliably acquiring sensor data pertaining to objects therein. The adaptive sensing system 101 may request information pertaining to area 126 from other sources, such as a sensing system 135 of vehicle 105. The adaptive sensing system 101 may request the information using a network broadcast and/or point-to-point communication. As disclosed in further detail herein, coordination may further comprise determining and/or refining sensor data and/or kinematic information (e.g., vector components) pertaining to objects in the vicinity of the vehicle 102 and determining and/or refining object position (e.g., by triangulating sensor data), size, angular extent, angle-dependent range, orientation, and so on.

The adaptive sensing system 101 may be further configured to provide sensor data acquired by the adaptive sensing system 101 to other entities, such as the vehicles 103, 104, and/or 105. The adaptive sensing system 101 may make sensor data available via the communication module 130 (e.g., may broadcast sensor data). Alternatively, or in addition, sensor data (and/or other information related to the adaptive sensing system 101) may be transmitted in response to requests from other entities (e.g., via a point-to-point communication mechanism).

In some embodiments, the adaptive sensing system 101 may be configured to coordinate operation with other entities. The adaptive sensing system 101 may be capable of obtaining reliable, accurate information pertaining to objects in certain areas (e.g., vehicle 103), but may not be capable of reliably obtaining information pertaining to objects in other areas (e.g., the obscured area 126). The adaptive sensing system 101 may coordinate with other sensing systems (e.g., sensing system 135) to provide those sensing systems with sensor data and/or collision detection information (e.g., portions of the collision detection model 122). In exchange, the other sensing systems 135 may provide the adaptive sensing system 101 with sensor data pertaining to objects in other areas, such as the obscured area 126. Coordinating operation with other sensing systems may comprise: configuring one or more sensors 110 to act as transmitters for other sensing systems 135 (e.g., in a bistatic and/or multistatic sensor configuration); configuring one or more sensors 110 to act as receivers for sensing signals generated by one or more other sensing systems 135; forming a multi-static sensor with one or more other sensing systems 135; and/or the like.

The adaptive sensing system 101 may make portions of the collision detection model 122 available to other vehicles 103, 104, and/or 105 (via the communication module 130). Alternatively, or in addition, the adaptive sensing system 101 may be configured to receive collision detection data from other vehicles 103, 104, and/or 105. The collision detection data may comprise sensor data, a collision detection model (and/or portions thereof), vehicle kinematics, collision detections, avoidance information, and so on.

As disclosed above, the collision detection module 124 may be configured to detect potential collisions using, inter alia, sensor data acquired by the adaptive sensing system 101 (and/or other sensing systems 135). The collision detection module 124 may comprise and/or be communicatively coupled to control systems 106 and/or human-machine interface components 107 of the vehicle 102. The human-machine interface components 107 may include, but are not limited to: visual display components (e.g., display screens, heads-up displays, or the like), audio components (e.g., a vehicle audio system, speakers, or the like), haptic components (e.g., power steering controls, force feedback systems, or the like), and so on.

The collision detection module 124 may use the human-machine interface components 107 to alert an operator of the vehicle 102 to potential collisions. The alert may comprise one or more of: an audible alert (e.g., alarm), a visual alert, a haptic alert, or the like. In some embodiments, the alert may comprise collision avoidance instructions to assist the operator in avoiding the potential collision (and/or a result of a potential collision involving other vehicles). The avoidance instructions may be provided as one or more audible instructions, visual cues (e.g., displayed on a heads-up display), haptic stimuli, or the like. For example, collision avoidance instructions may be conveyed audibly through a speaker system of the vehicle (e.g., instructions to "veer left"), visually through icons on a display interface (e.g., a turn icon, brake icon, release brake icon, etc.), and/or by haptic feedback (e.g., vibrating a surface, actuating a control input, and so on). Although particular examples of alerts are described herein, the disclosure is not limited in this regard and could be adapted to incorporate any suitable human-machine interface components 107.

The collision detection module 124 may be further configured to take one or more automatic collision mitigation actions in response to detecting a potential collision. The collision mitigation actions may include, but are not limited to: activating an internal or external airbag, tightening a seatbelt, positioning a head restraint, extending a bumper, and so on. The collision detection module 124 may be further configured to take one or more automatic collision avoidance actions in response to detecting a potential collision. The collision avoidance actions may include, but are not limited to: accelerating, decelerating, turning, actuating vehicle systems (e.g., lighting systems, horn, etc.), and so on. Accordingly, the collision detection module 124 may be communicatively coupled to control systems 106 of the vehicle 102, and may be capable of providing control inputs thereto. The automatic collision avoidance actions may be configured to prevent the potential collision, avoid a result of the potential collision (e.g., a collision involving other vehicles), and so on. The automatic collision avoidance actions may be determined in cooperation with other vehicles. For example, the adaptive sensing system 101 may cooperate with the vehicle 103 to determine collision avoidance actions (or instructions) that allow both vehicles 102, 103 to avoid the potential collision, while also avoiding each other.

The collision detection module 124 may be configured to implement the automatic collision avoidance actions without the consent and/or intervention of the vehicle operator. Alternatively, or in addition, the collision detection module 124 may request consent from the operator before taking the automatic collision avoidance actions. The human-machine interface components 107 may comprise one or more inputs configured to allow the vehicle operator to indicate consent, such as a button on a control surface (e.g., steering wheel), an audio input, a visual input, or the like. The consent may be requested at the time a potential collision is detected and/or may be requested a priori, before a potential collision is detected. The consent may expire after a pre-determined time and/or in response to certain, pre-determined conditions (e.g., after the potential collision has been avoided, after the vehicle 102 is shut down, etc.). Accordingly, the collision detection module 124 may be configured to periodically re-request the consent of the vehicle operator. For example, the adaptive sensing system 101 may request consent to implement automatic collision avoidance actions each time the vehicle 102 is started.

The collision detection module 124 may be configured such that the automatic collision avoidance actions cannot be overridden by the vehicle operator. Accordingly, the collision detection module 124 may be configured to "lock out" the vehicle operator from portions of the vehicle control system 106. Access to the vehicle control system 106 may be restored after the automatic collision avoidance actions are complete and/or the collision detection module 124 determines that the potential collision has been avoided. The collision detection module 124 may be configured to "lock out" the vehicle operator from all vehicle control operations. Alternatively, the vehicle operator may be allowed limited access to the control system 106. For example, the control system 106 may accept operator inputs that do not interfere and/or conflict with the automatic collision avoidance actions (e.g., the vehicle operator may be allowed to provide limited steering input, but not acceleration/deceleration).

Alternatively, the collision detection module 124 may be configured to allow the vehicle operator to override one or more of the automatic collision avoidance actions. In response to an override, the collision detection module 124 may stop implementing automatic collision avoidance actions and may return control to the vehicle operator. An override may comprise the vehicle operator providing an input to the control system 106 (or other human-machine interface component 107). In some embodiments, the collision detection module 124 may implement the automatic collision avoidance actions by actuating controls of the vehicle 102 (e.g., turning the steering wheel), and an override may comprise the vehicle operator resisting or counteracting the automatic control actuations.

In some embodiments, the collision detection module 124 may be capable of preemptively deploying and/or configured to preemptively deploy safety systems of the vehicle 102. The collision detection module 124 may be configured to deploy one or more airbags before the impact of the collision occurs. The collision detection module 124 may be further configured to adapt the deployment of the safety systems to the imminent collision (e.g., adapt safety system deployment in accordance with the location on the vehicle 102 where a collision impact is to occur).

The adaptive sensing system 101 may continue acquiring sensor data (and the processing module 120 may continue updating the collision detection model 122) while the collision detection module 124 is implementing the alerts and/or avoidance actions disclosed herein. The collision detection module 124 may, therefore, continuously update the alerts and/or avoidance actions in response to changing kinematics (e.g., the result of one or more collisions, the actions of other vehicles 103,104, and the like).

The adaptive sensing system 101 may be configured to store collision detection information in the computer-readable storage resources 113 and/or a network-accessible service 154, which may include, but is not limited to: kinematics of the vehicle 102, operator control inputs (e.g., steering, braking, etc.), the collision detection model 122 (e.g., kinematics of other vehicles, collision detections, etc.), actions taken in response to detecting potential collisions, operator override of automatic collision avoidance actions, communication with other vehicles, and so on. Accordingly, the computer-readable storage resources 113 of the adaptive sensing system 101 may act as a "black box" detailing the operating conditions of the vehicle 102 and/or other peri-collisional circumstances.

The adaptive sensing system 101 may be configured to prevent unauthorized access to and/or modification of stored information. Accordingly, information stored on the computer-readable storage resources 113 and/or transmitted via the network 152 may be encrypted and/or signed. The information may be stored with validation information; in some embodiments, the adaptive sensing system 101 may be configured to cryptographically sign stored information.

Figure 2A:
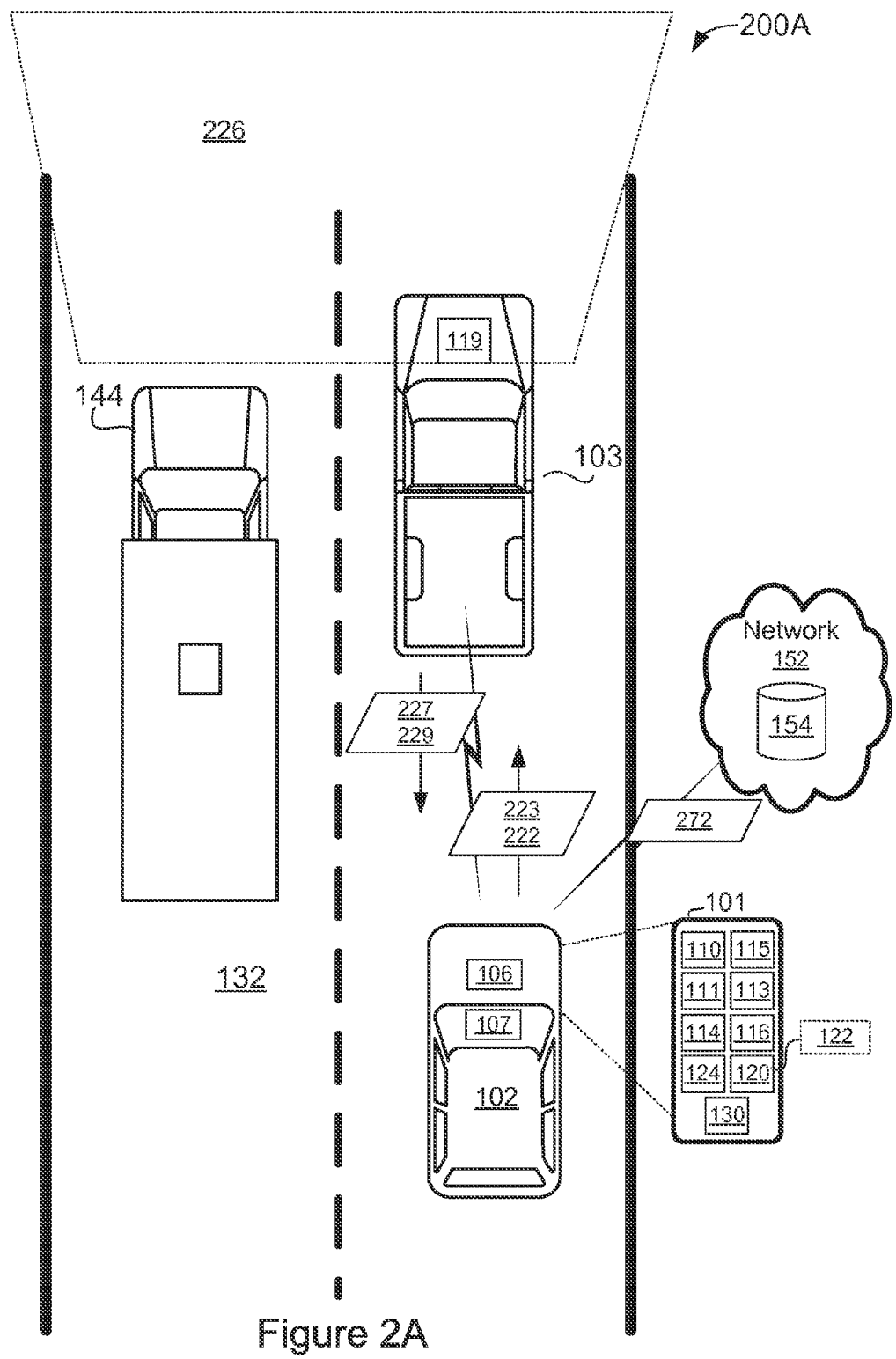
FIG. 2A is a block diagram depicting a system comprising another embodiment of an adaptive sensing system.

FIG. 2A is a block diagram depicting a system comprising another embodiment of an adaptive sensing system 101. An area 226 may be inaccessible to the adaptive sensing system 101. The adaptive sensing system 101 may determine that the area 226 is inaccessible based on, inter alia, the position and/or configuration of the vehicles 103 and 144 in the collision detection model 122 and/or a current configuration of the sensors 110. In response, the adaptive sensing system 101 may modify the configuration of one or more of the sensors 110 to acquire sensor information pertaining to objects in the area 226 (if any). The adaptive sensing system 101 may, for example, configure one or more sensors to transmit detection signal(s) underneath, around, over, and/or through one or more of the vehicles 103 and/or 144. Modifying the configuration of the sensors 110 may include determining one or more signal paths to/from the area 226 using the collision detection model 122. The determined signal paths may include one or more other objects, such as the vehicles 103 and/or 144, the road surface 132, road structures, and/or the like, as disclosed above. One or more of the determined signal path(s) may be configured to reflect and/or bound off of one or more other objects, pass through one or more objects, and/or the like. Determining the signal path(s) may further comprise determining signal propagation properties of the signal paths, such as signal absorption, diffusion, reflectance, and so on. The sensor management module 114 may be configured to modify the configuration of one or more of the sensors 110 in accordance with the determined signal path(s), which may include, but is not limited to: steering and/or directing one or more of the sensors 110 (e.g., beamforming a phased array); modifying the wavelength, frequency, phase, polarization, amplitude, power, and/or the like of one or more sensing signals; modifying filter parameters, gain parameters, and so on of one or more signal detectors; changing the position and/or orientation of one or more of the sensors 110; and/or the like.

Alternatively, or in addition, the adaptive sensing system 101 may be configured to acquire sensor data pertaining to the area 226 from other sensing systems, such as a sensing system 119 of the vehicle 103. The adaptive sensing system 101 may be configured to transmit a request 223 for sensor data pertaining to the area 225 (via the communication module 130). The request 223 may comprise a request for sensor data pertaining to the particular area 226 and/or may comprise a request for all available sensor data. The request 223 may be directed to a particular entity (e.g., vehicle 103) and/or may be broadcast to any source capable of satisfying the request 223. Accordingly, in some embodiments, the request 223 may comprise establishing a communication link with the sensing system 119 of the vehicle 103 (e.g., discovering the vehicle 103 via one or more network discovery broadcast messages, performing a handshake protocol, and so on).

The request 223 may comprise an offer of compensation in exchange for access to the requested sensor data. Accordingly, the request 223 may comprise a negotiation to establish an acceptable exchange (e.g., an acceptable payment, reciprocal data sharing, or the like). The negotiation may occur automatically in accordance with pre-determined policy, rules, and/or thresholds stored by use of the computer-readable storage resources 113. Alternatively, the negotiation may comprise interacting with occupant(s) of the vehicles 102, 103 and/or other entities (e.g., via the network 152). The vehicles 102, 103 may, for example, be associated with organizations that have agreed to share collision detection information (e.g., an automobile association, insurance carrier, or the like). In some embodiments, the sensing system 119 of the vehicle 103 may be configured to broadcast the sensor data automatically, such that an explicit request 233 for the sensor data is not required.

The vehicle 103 may provide sensor data 227, which may be received via the communication module 130. The sensor data 227 may comprise sensor data acquired by the sensing system 119 of the vehicle 103 (or acquired by one or more other vehicles or sources (not shown)). The adaptive sensing system 101 may use the sensor data 227 to generate and/or refine the collision detection model 122 and/or detect potential collisions, as disclosed herein. The processing module 120 may generate a collision detection module 124 that incorporates the sensor data 227 along with sensor data acquired by use of the adaptive sensing system 101, and/or sensor data acquired by use of the adaptive sensing system 101 operating in a modified configuration adapted to acquire information pertaining to the area 226. In some embodiments, the vehicle 103 may provide auxiliary data 229 in addition to (and/or in place of) the sensor data 227. The auxiliary data 229 may comprise processed sensor data, such as "self-knowledge" pertaining to the vehicle 103, which may include, but is not limited to: vehicle identification, vehicle size, vehicle orientation, vehicle weight, position (absolute position or position relative to the vehicle 102), velocity (e.g., a speedometer reading), acceleration (e.g., accelerometer readings), a time reference (e.g., a time synchronization signal), and so on. The processing module 120 may use the auxiliary data 229 to translate the sensor data 227 into a frame of reference of the vehicle 102 or other suitable frame of reference, as described above. Translating the sensor data 227 may further comprise aligning sensor data (e.g., aligning the sensor data 227 with sensor data acquired by the adaptive sensing system 101). Aligning may comprise time shifting and/or time aligning the sensor data 227 relative to other sensor data samples and/or streams. As such, aligning the sensor data 227 may comprise aligning time-stamped sensor data, extrapolating sensor data (e.g., extrapolating a position from velocity and/or orientation, extrapolating velocity from acceleration, and so on), time shifting sensor data, and so on.

In some embodiments, the adaptive sensing system 101 may be configured to provide collision detection data 222 to the vehicle 103. The collision detection data 222 may include, but is not limited to: the collision detection model 122 (and/or a portion thereof), sensor data acquired by the adaptive sensing system 101, information pertaining to potential collisions detected by the collision detection module 124, auxiliary data pertaining to the vehicle 102, and so on. Accordingly, in some embodiments, the processing module 120 and/or collision detection module 124 may be configured to aggregate sensor data from multiple sources (e.g., the adaptive sensing system 101, vehicle 103, and so on), generate a collision detection model 122 using the combined sensor data (and/or auxiliary data, if any), and provide the collision detection model 122 to other vehicles 103, 144 (by transmitting the collision detection data 222). Accordingly, vehicles in a communication range of the vehicle 102 (communication range of the communication module 130) may take advantage of the collision detection model 122. In some embodiments, one or more vehicles may be configured to re-transmit and/or re-broadcast the collision detection data 222 to other vehicles, which may extend an effective communication range of the adaptive sensing system 101 (e.g., as in an ad-hoc wireless network configuration).

As disclosed above, in some embodiments, the adaptive sensing system 101 may be configured to provide and/or store monitoring data 272 to one or more persistent storage systems, such as the network-accessible service 154, computer-readable storage resources 113, and/or the like. The monitoring data 272 may include, but is not limited to: the collision detection model 122, sensor data acquired by the adaptive sensing system 101 and/or received from other sources, information pertaining to potential collisions detected by the collision detection module 124, collision alerts generated by the collision detection module 124, operator inputs to the vehicle 102, diagnostic information pertaining to the vehicle 102 and/or other vehicles 103, 144, operating conditions, location (e.g., GPS coordinates), time information, and so on. The diagnostic information may include, but is not limited to: indications of whether other vehicles 103, 144 comprise collision detection systems and/or are configured to coordinate collision detection with the collision detection module 124, indications of whether other vehicles 103, 144 are capable of communicating with the collision detection module 124 (e.g., capable of receiving collision detection data), actions taken in response to detecting a potential collision and/or alerting other vehicles to a potential collision, and so on.

The monitoring data 272 may be used to reconstruct peri-collisional conditions, such as the kinematics of vehicles 102, 103, and/or 144 before, during, and/or after a collision. The monitoring data 272 may further include information pertaining to the actions (if any) taken by the vehicles 102, 103, and/or 144 in response to detecting a potential collision (e.g., operator control inputs, automatic collision avoidance actions, etc.), and so on. In some embodiments, the monitoring data 272 may comprise timestamps and/or other auxiliary data to allow a location and/or time of the monitoring data 272 to be determined.

The monitoring data 272 may further comprise vehicle identifying information (e.g., information identifying the vehicle 102, 103, and/or 144), such as a vehicle identification number (VIN), license plate information, registration information, vehicle make, model, and color designations, and so on. The vehicle identifier(s) may be derived from sensor data acquired by the adaptive sensing system 101 (or other vehicle 103) and/or may be received as auxiliary data from one or more other vehicles; for instance the vehicles 102, 103, and/or 144 may be configured to provide identifying information to other vehicles (e.g., broadcast identifying information via a network, near-field communication, BLUETOOTH®, or the like). In other examples, one or more of the vehicles 102, 103, and/or 144 may comprise a Radio Frequency Identifier (RFID), which may be interrogated by an RFID reader of the adaptive sensing system 101. Other objects may comprise identifying information, such as pedestrians, buildings, road features (e.g., street signs, traffic lights, etc.), and so on. These objects may be configured to provide identifying information to one or more of the vehicles 102, 103, and/or 144, which may incorporate the identifying information into the collision detection model 122 and/or monitoring data 272. For example, a person may carry an item that is configured to broadcast and/or provide identifying information (e.g., via RFID), such as the person's name, address, allergies, emergency contact information, insurance carrier, license number, and so on. Similarly, road features may be configured to provide identifying information. In another embodiment, a traffic signal may be configured to broadcast location information (e.g., the location of the signal), state information (e.g., red light, green light, etc.), and so on.

The monitoring data 272 may be secured to prevent the monitoring data 272 from being modified. In some embodiments, the monitoring data 272 may comprise a digital signature, may be encrypted, may comprise an authentication credential, and/or the like.

In some embodiments, a network-accessible service 154 may be configured to store monitoring data 272 from a plurality of different vehicles. The monitoring data 272 may be received via the network 152 and/or extracted from storage devices of one or more vehicles (e.g., computer-readable storage resources 113 of vehicle 102). The network-accessible service 154 may index and/or arrange the monitoring data 272 by time, location, vehicle identity, and so on. The network-accessible service 154 may provide monitoring data 272 to a requester based upon a selection criteria (e.g., time, location, identity, etc.). In some embodiments, the network-accessible service 154 may provide consideration for the monitoring data 272 (e.g., a payment, reciprocal access, etc.).

In some embodiments, the collision detection data 222 may be provided to an emergency services entity in response to detecting a collision. The collision detection data 222 may be used to determine and/or estimate collision kinematics (e.g., impact velocity, impact vectors, etc.), which may be used to estimate forces involved in the collision, probable injury conditions, the final resting location of vehicles (or vehicle occupants) involved in the collision, and so on.

The adaptive sensing system 101 may be further configured to respond to requests for collision detection data 222. In some embodiments, adaptive sensing system 101 may provide sensor data to one or more other vehicles (e.g., vehicle 103) in response to a request, as described above. In another example, the adaptive sensing system 101 may provide the collision detection model 122 (and/or a portion thereof) to other vehicles and/or entities. The adaptive sensing system 101 may be configured to store collision detection data, such as the collision detection model 122 and/or acquired sensor data to a network-accessible service 154, emergency services entity, traffic control entity, or the like, via the network 152.

Figure 2B:
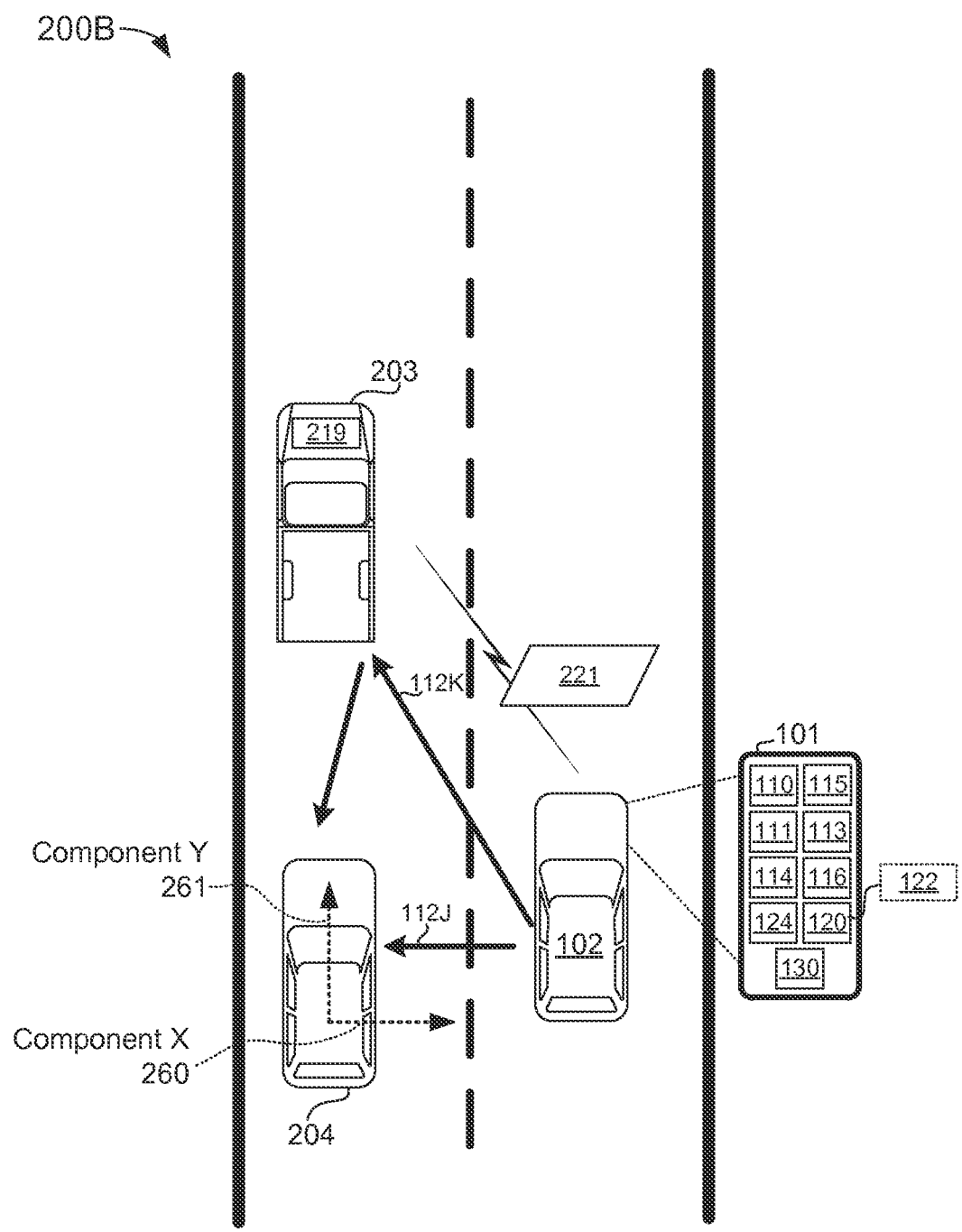
FIG. 2B is a block diagram depicting a system comprising another embodiment of an adaptive sensing system.

FIG. 2B is a block diagram of a system 200B depicting another embodiment of an adaptive sensing system 101. As disclosed herein, the collision detection model 122 may comprise object kinematics, which may include various characteristics and/or components of object motion characteristics (e.g., different components of velocity, acceleration, etc.). Kinematic information may be expressed as vector quantities in a particular coordinate system and/or frame of reference (e.g., Cartesian coordinate system, polar coordinate system, or the like). The quantities may be relative to a particular frame of reference (e.g., vehicle 102, 203, etc.). Vector quantities may be deconstructed into one or more component quantities; in a Cartesian coordinate system, a vector quantity may comprise x, y, and/or z component quantities; in a polar coordinate system, a vector quantity may comprise r, theta (range and angle), and/or z component quantities; and so on. In some embodiments, the ability of a sensing system to determine particular components of object kinematics may depend, inter alia, upon the position and/or orientation of the sensing system relative to the object. For example, a Doppler radar may be capable of acquiring data pertaining to certain components of object kinematics, but not others, depending upon an orientation and/or position of the Doppler radar relative to the object.

As illustrated in FIG. 2B, the adaptive sensing system 101 may be positioned and/or oriented relative to the vehicle 204, such that a current configuration of the sensors 110 are capable of acquiring object kinematics pertaining to component 260 (e.g., the "x axis" component, which corresponds to "side-to-side" range, velocity, and so on) by use of sensing signals 112J. The sensors 110, however, may not be positioned and/or configured to accurately determine component Y 261 (e.g., the "y axis" component, which corresponds to "forward" range, velocity, and so on). For example, the adaptive sensing system 101 may comprise a Doppler radar, which is effective at determining component X 260, but not component Y 261. The adaptive sensing system 101 may determine that the position and/or orientation of the sensors 110 is incompatible with acquiring information pertaining to component Y 261 (using, inter alia, the collision detection model 122) and, in response, may reconfigure one or more of the sensors 110. In the FIG. 2B embodiment, reconfiguring the sensors 110 may comprise directing one or more other sensing signals 112K to the vehicle 204 by use of the vehicle 203, as disclosed herein. The sensing signals 112K may be configured to capture information pertaining to component Y 261. Alternatively, or in addition, the processing module 120 may be configured to derive information pertaining to component Y 261 from other sensor information, such as changes to the position of the vehicle 204 and/or the like.

In some embodiments, the adaptive sensing system 101 may be configured to acquire sensor data pertaining to component Y 261 from another sensing system, such as the sensing system 219 of vehicle 203. The sensing system 219 may be capable of acquiring object kinematics pertaining to component Y 261, but not component 260. The adaptive sensing system 101 may be configured to share sensor data 221 with the vehicle 203, which may comprise providing sensor data 221 acquired by use of sensing signals 112J and/or 112K. The adaptive sensing system 101 may be further configured to request sensor data acquired by the sensing system 219 of the vehicle 203 (pertaining to component Y 261). The sensor data 221 may be communicated to/from the adaptive sensing system 101 using the communication module 130, as disclosed herein.

The processing module 120 may be configured to combine (e.g., "fuse") the sensor data acquired by the adaptive sensing system 101 (pertaining to component X 260) with the sensor data acquired from the vehicle 203 (and pertaining to component Y 261) to thereby develop a more complete and accurate model of the kinematics of the vehicle 204. Fusing the sensor data may comprise translating the sensor data into a common coordinate system and/or frame of reference, weighting the sensor data, and so on. The sensor data may be combined to determine object kinematics. In the FIG. 2B embodiment, fusing the sensor data may comprise using the sensor data acquired by the adaptive sensing system 101 to determine component X 260 of object kinematics (e.g., side-to-side kinematic characteristics) and using the sensor data acquired by the vehicle 203 to determine object kinematics in component Y 261 (e.g., forward kinematic characteristics). Alternatively, or in addition, fusing the sensor data may comprise combining sensor data acquired from the sensing system 219 with sensor data pertaining to component Y 261 determined using the sensing signals 112K. Accordingly, fusing the sensor data may comprise refining sensor data using component analysis or other suitable processing techniques.

Fusing may further comprise combining range and/or angle information of the sensor data 221 to determine and/or refine a position of the vehicle 204 relative to the vehicle 102 and/or 203, which may comprise triangulating range and/or angle information of the sensor data. Similarly, fusing the sensor data may comprise determining object size, orientation, angular extent, angle-dependent range, and so on. In some embodiments, the processing module 120 may use range information acquired by different sensing systems at different locations to determine the position and/or angular orientation of an object (e.g., using intersecting range radii analysis).

Combining sensor data may further comprise weighting the sensor data acquired from different sensors 110 and/or sensing systems 219. Sensor data may be weighted in accordance with the estimated accuracy of the data (e.g., signal-to-noise ratio), sensor data orientation and/or position relative to a particular object, and so on. In the FIG. 2B embodiment, sensor data pertaining to component Y 261 acquired by use of the sensing system 219 may be weighted more heavily than the sensor data acquired by use of the sensing signals 112J and/or 112K based on, inter alia, the position of the sensing system 219 relative to component Y 261 of the vehicle 204. The disclosure is not limited in this regard, however; other sensor orientations and/or configurations may result in different types of sensor data combinations and/or weightings.

Figure 2C:
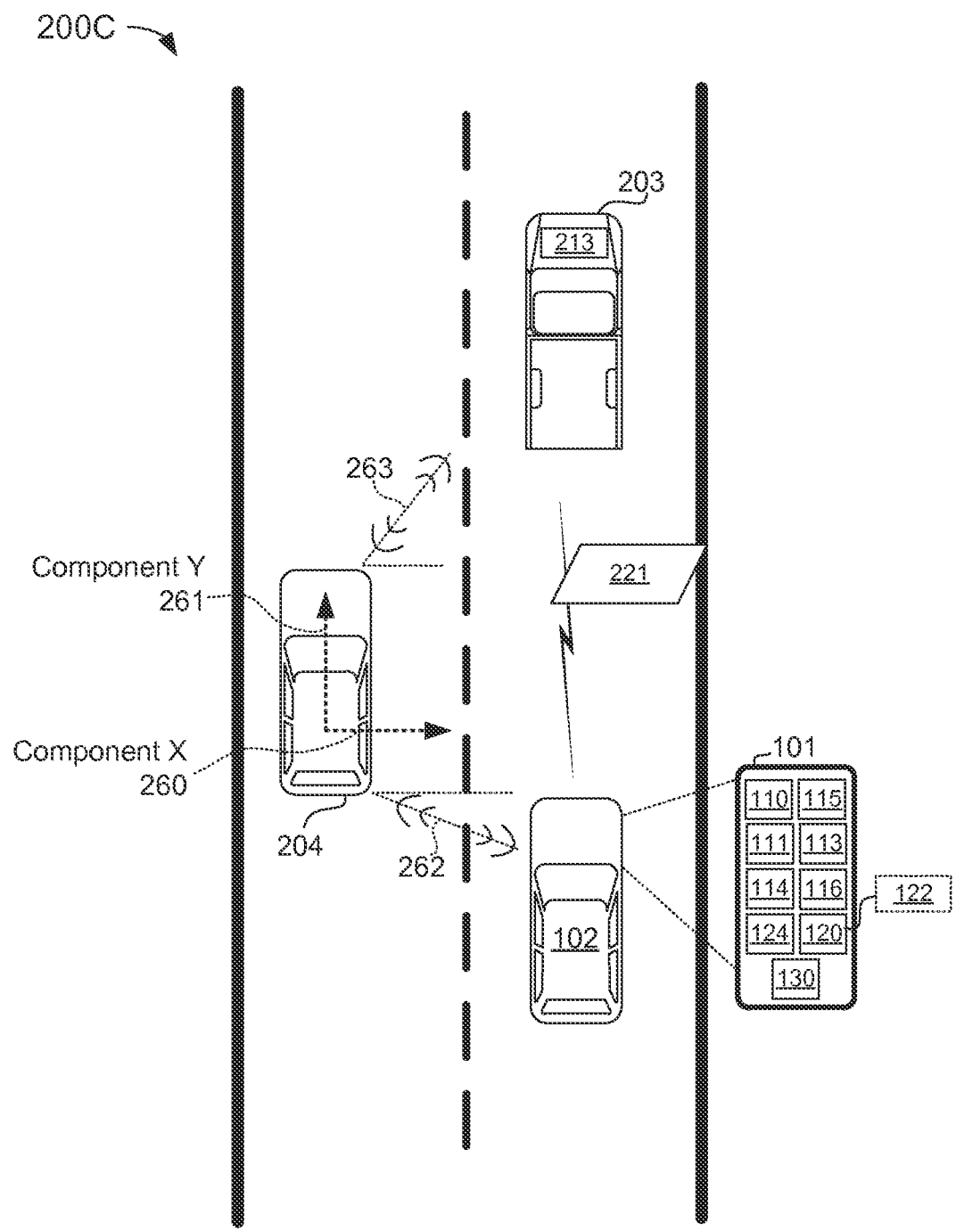
FIG. 2C is a block diagram depicting a system comprising another embodiment of an adaptive sensing system.

FIG. 2C is a block diagram of a system 200C comprising another embodiment of an adaptive sensing system 101. In the FIG. 2C embodiment, vehicles 102 and 203 are at different orientations relative to the vehicle 204. In response, the adaptive sensing system 101 may modify the configuration of one or more of the sensors 110 to acquire sensor data pertaining to different kinematic components 260 and/or 261 of the vehicle 204, as disclosed herein.

Alternatively, or in addition, the adaptive sensing system 101 may combine sensor data acquired by use of the sensors 110 with sensor data acquired by use of the sensing system 213. The processing module 120 may combine the sensing data in accordance with the different relative positions of the vehicles 102, 203, and 204. The component 260 may be determined by a combination of the sensor data acquired by the adaptive sensing system 101 and sensor data acquired by the vehicle 203 (as opposed to primarily sensor data acquired by the adaptive sensing system 101, as in the FIG. 2B embodiment). The relative contributions of the different sensor data may be based, inter alia, on the orientation (e.g., angles 262, 263) of the vehicles 102 and 203 to the vehicle 204. The combination may update dynamically in response to changes in the relative position and/or orientation of the vehicles 102, 203, and/or 204 (e.g., changes to the angles 262 and/or 263).

In some embodiments, fusing the sensor data may further comprise weighting the sensor data. The relative weights of sensor data may correspond to a signal-to-noise ratio of the sensor data, a position and/or orientation of the sensor data to a particular object, and so on. Accordingly, weights may be applied on a per-object basis. Referring back to the FIG. 2B embodiments, weights for the sensor data acquired by the adaptive sensing system 101 for component X 260 may be relatively high (due to the sensors 110 of the adaptive sensing system 101 being ideally positioned to measure component X 260), and the weights for the sensor data for component Y 261 may be low (due to the poor position of the sensors 110 for measuring component Y 261). The weights of the sensor data pertaining to component Y 261 may be increased in response to modifying the configuration of the adaptive sensing system 101 to acquire sensor data using, inter alia, sensing signals 112K.

Figure 3:
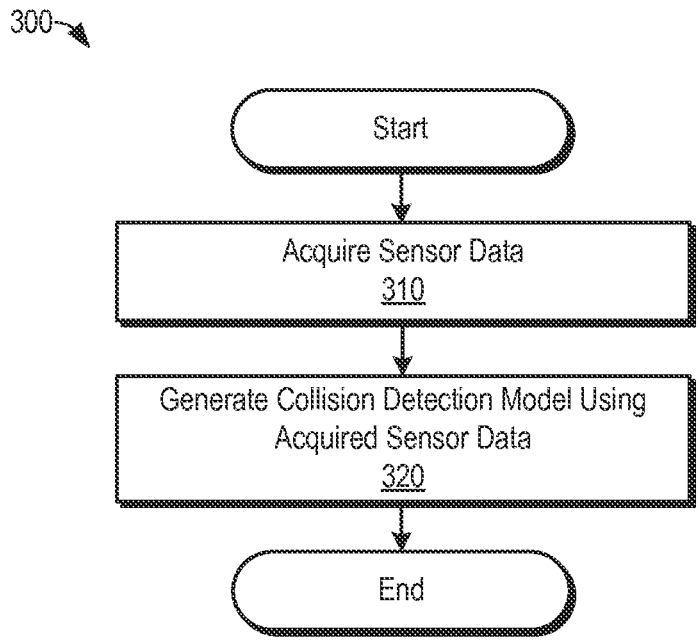
FIG. 3 is a flow diagram of one embodiment of a method for acquiring sensor data using an adaptive sensing system.

FIG. 3 is a flow diagram of one embodiment of a method 300 for acquiring sensor data using an adaptive sensing system. The method 300 may be implemented by an adaptive sensing system 101 of a vehicle 102, as disclosed herein. In some embodiments, the method 300 may be embodied as instructions stored on a persistent, machine-readable storage medium (e.g., computer-readable storage resources 113). The instructions may be configured to cause a processor to perform one or more of the steps and/or operations of the method 300.

Step 310 may comprise acquiring sensor data at a vehicle 102. The sensor data of step 310 may include sensor data acquired from a source that is external to the vehicle 102, such as another vehicle. The sensor data may be acquired in response to a request and/or negotiation, as described above. Alternatively, the sensor data may be acquired without a request (e.g., the sensor data acquired at step 320 may be broadcast from a source, as described above). In some embodiments, step 310 may further comprise receiving auxiliary data from a source of the sensor data. The auxiliary data may comprise a "self-knowledge" data pertaining to the source of the sensor data, such as size, weight, orientation, position, kinematics, and so on.

In some embodiments, step 310 may comprise fusing the sensor data acquired from different sources and/or by use of different sensors 110. Accordingly, step 310 may comprise translating sensor data into a suitable coordinate system and/or frame of reference (e.g., using auxiliary data of the vehicle 102 and/or the source(s) of the sensor data). Fusing the sensor data may further comprise weighting and/or aligning the sensor data, which may comprise time shifting the sensor data, extrapolating the sensor data, or the like, as described above.

Step 320 may comprise generating a collision detection model 122 using the sensor data acquired at step 310. Generating the collision detection model 122 may comprise determining object kinematics using the sensor data, such as object position, velocity, acceleration, orientation, and so on. Generating the collision detection model 122 may further comprise determining and/or estimating object size, weight, and so on. Step 320 may comprise combining sensor data to determine and/or refine one or more component quantities. In some embodiments, step 320 comprises triangulating range and/or angle information in the sensor data to determine object position, applying intersecting range radii analysis to determine angular orientation, fusing sensor data to determine different components of object kinematics, and so on.

Step 320 may further comprise translating the collision detection model 122 into a suitable coordinate system and/or frame of reference. Step 320 may, therefore, comprise generating a collision detection model in a particular frame of reference (e.g., relative to the vehicle 102). Step 320 may further comprise translating the collision detection model into other coordinate systems and/or frames of reference. Step 330 may comprise translating the collision detection model 122 into the frame of reference of another vehicle. The translation may be based on a position, velocity, acceleration, and/or orientation of the source(s) of the sensor data acquired at step 320 and/or a position, velocity, acceleration, and/or orientation of a particular frame of reference.

In some embodiments, step 320 may further comprise detecting a potential collision using the collision detection model and/or taking one or more actions in response to detecting the potential collision, as disclosed herein.

Figure 4:
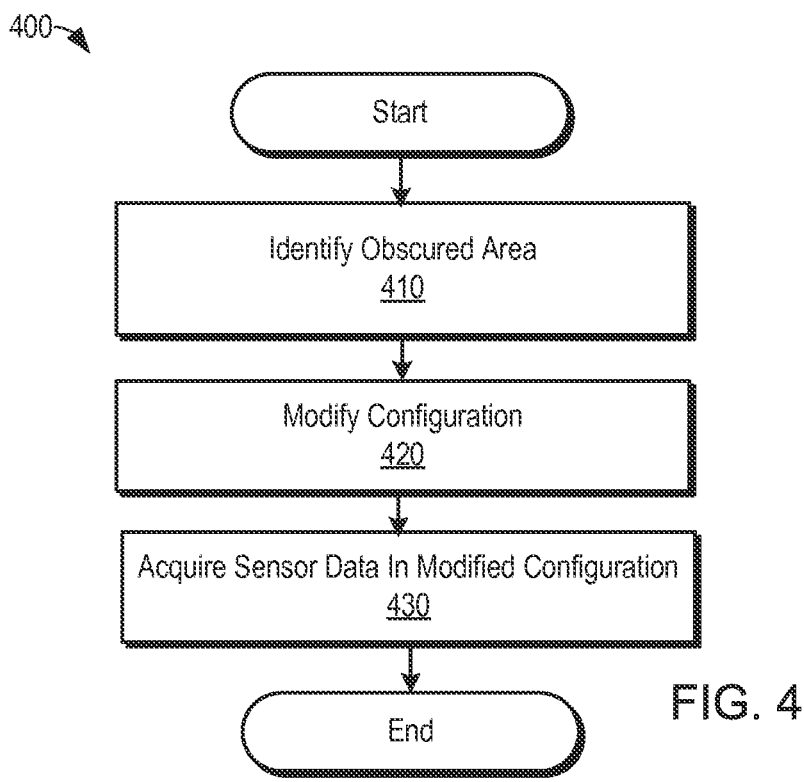
FIG. 4 is a flow diagram of another embodiment of a method for acquiring sensor data using an adaptive sensing system.

FIG. 4 is a flow diagram of another embodiment of a method 400 for acquiring sensor data using an adaptive sensing system.

Step 410 may comprise determining that a current configuration of the adaptive sensing system 101 includes one or more obscured areas (e.g., areas in which sensing signals of the current configuration of the adaptive sensing system 101 are obscured by one or more other objects).

Step 410 may comprise identifying the obscured areas using a collision detection model 122 comprising the position, orientation, and/or dimensions of one or more objects detected by the adaptive sensing system 101. Step 410 may further comprise evaluating signal paths of one or more detection signal(s) being generated by the adaptive sensing system 101 in a current configuration of the adaptive sensing system 101 to identify regions (if any) that are obscured from the detection signal(s). Accordingly, step 410 may comprise detecting a vehicle 103 (or other object) positioned in front of the vehicle 102 resulting in an obscured area 126 as illustrated in FIG. 1A.

Step 410 may further comprise identifying uncharacterized portions of the obscured area(s). As disclosed herein, an object may be partially within an obscured area, such that a first portion of the object is within the obscured area, and a second portion is outside of the obscured area (within the sensor range of the adaptive sensing system 101). Step 410 may comprise inferring information pertaining to obscured portion of the object from the sensor data pertaining to the unobscured portion. Inferring the information may comprise determining object kinematics, size, orientation, and/or the like from the partial sensor data. Step 410 may further comprise designating the portions of the obscured area that are not occupied by the object as uncharacterized portions, as disclosed above.

Step 420 may comprise modifying the configuration of one or more of the sensors 110 of the adaptive sensing system 101 to acquire sensor data pertaining to the obscured areas and/or uncharacterized portions thereof, as identified in step 410. Modifying the configuration of the sensors 110 may comprise determining one or more signal path(s) between one or more of the sensors 110 and the obscured areas. The signal path(s) include one or more other objects, such as other vehicles, the road surface, road structures, and/or the like. In some embodiments, the signal path(s) may pass through one or more vehicles (e.g., pass through the windows of the vehicle 103). The signal path(s) may comprise signal path(s) from the adaptive sensing system 101 to the obscured areas and/or signal path(s) from the obscured areas back to the adaptive sensing system 101. Accordingly, step 420 may comprise modeling one or more objects in the collision detection model 122, which may comprise identifying which portions of the objects (if any) are capable of propagating a detection signal. Step 420 may further comprise identifying non-metallic and/or non-ferrous portions of the object through which certain types of sensing signals may propagate.

Step 420 may further comprise determining signal propagation properties of one or more of the determined signal path(s), such as signal attenuation, reflectance, absorption, diffusion, and the like. Modifying the configuration of the sensors may further comprise configuring the detection signal(s) of the sensor(s) 110 in accordance with the determined signal propagation properties. Step 420 may comprise determining a suitable detection signal wavelength, frequency, phase, amplitude, polarization, power, and/or the like in accordance with the signal propagation properties of the signal path(s). Alternatively, or in addition, modifying the configuration of the sensing system may comprise repositioning one or more of the sensors 110, as disclosed herein.

Step 430 may comprise acquiring sensor data pertaining to the obscured areas using the adaptive sensing system 101 in the modified configuration of step 420. Step 430 may further comprise updating the signal path(s) in accordance with the collision detection model 122. Step 430 may further comprise periodically and/or continuously modifying the configuration of the adaptive sensing system 101 to acquire sensor data pertaining to different, obscured areas in the vicinity of the vehicle 102.

In some embodiments, step 430 may further include using the sensor data acquired by use of the sensing system in the modified configuration(s) to detect and/or respond to potential collisions, as disclosed herein. The potential collision may pertain to the vehicle 102 and/or one or more other vehicles 103, 104, and/or 105 and/or objects.

Figure 5:
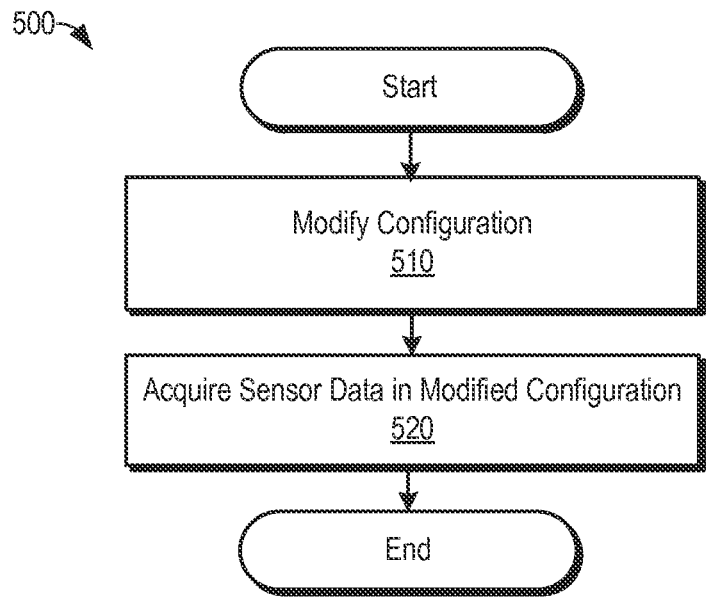
FIG. 5 is a flow diagram of another embodiment of a method for acquiring sensor data using an adaptive sensing system.

FIG. 5 is a flow diagram of another embodiment of a method 500 for acquiring sensor data using an adaptive sensing system 101. Step 510 may comprise modifying the configuration of the adaptive sensing system 101. The configuration may be modified in response to receiving sensor data indicating that a first object is being obscured by one or more other objects. Step 510 may, therefore, comprise acquiring sensor data by use of the adaptive sensing system 101 operating in a first configuration to gather sensor data pertaining to the first object and one or more other objects in the vicinity of the vehicle 102.

Step 510 may further comprise determining that the first object is obscured by the one or more other objects. As disclosed above, determining that the first object is obscured may comprise one or more of: evaluating the position of the objects in the collision detection model 122 in view of the current configuration of the adaptive sensing system 101; receiving partial sensor data pertaining to the first object; distinguishing sensor data pertaining to the first object from sensor data of the other object(s) based on, inter alia, the objects having different kinematic characteristics, different positions, sizes, Doppler characteristics, time-of-flight, and/or the like; receiving sensor data pertaining to the first object from one or more other sensing systems; and/or the like.

Modifying the configuration of the adaptive sensing system 101 may comprise determining one or more signal path(s) to/from the first object and modifying the configuration of one or more sensors 110 accordingly. Modifying the configuration of the sensors 110 may comprise modifying the configuration of one or more detection signal(s) generated by the sensors 110, beamforming a plurality of sensors 110, modifying the configuration of one or more detectors of the sensors 110, and the like. Alternatively, or in addition, modifying the configuration of the one or more sensors 110 may comprise repositioning one or more detection signal emitters and/or detectors, as disclosed herein (e.g., using the sensor positioning module 116).

Step 520 may comprise acquiring sensor data by use of the adaptive sensing system 101 in the modified configuration, as disclosed herein. Step 520 may further comprise generating a collision detection model 122 and detecting and/or responding to potential collisions using the collision detection model 122. Step 520 may further comprise incorporating sensor data acquired by other sensing systems of one or more other vehicles to generate the collision detection model 122, detect potential collisions, and/or coordinate collision avoidance actions, as disclosed herein.

Figure 6:
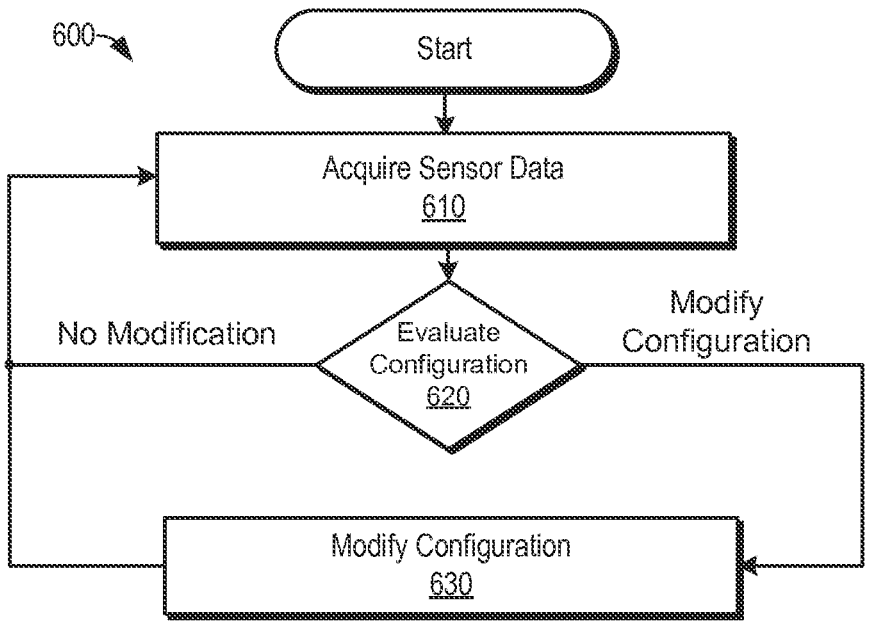
FIG. 6 is a flow diagram of another embodiment of a method for acquiring sensor data using an adaptive sensing system.

FIG. 6 is a flow diagram of another embodiment of a method 600 for acquiring sensor data using an adaptive sensing system 101. Step 610 may comprise acquiring sensor data according to a current configuration of the adaptive sensing system 101, as disclosed above.

Step 620 may comprise evaluating the configuration of the adaptive sensing system 101. Evaluating the configuration of the adaptive sensing system 101 may comprise generating a collision detection model 122 using the sensor data; identifying obscured areas using the collision detection model 122 (if any), identifying objects that are obscured by other objects (if any), evaluating the quality of sensor data acquired by the sensors 110; evaluating the quality of various component quantities derived from the sensor data based on, inter alia, the orientation and/or position of the sensors 110 to the object(s); and so on. Step 620 may further comprise determining whether to modify the current configuration of the adaptive sensing system in order to improve the sensor data acquired thereby. The evaluation of step 620 may comprise identifying alternative signal path(s) (if any) to/from various areas and/or objects that are at least partially obscured in the current configuration of the adaptive sensing system. The evaluation of step 620 may further comprise identifying and/or predicting obscured areas and/or objects that would exist in the alternative configuration. In some embodiments, for example, certain areas that are obscured in a first configuration are not obscured in a second configuration, and areas not obscured in the first configuration are obscured in the second configuration. The evaluation of step 620 may, therefore, comprise a tradeoff between obscuring different areas and/or objects. The evaluation of step 620 may be time-variant, such that the configuration is periodically and/or continuously changed in order to provide full coverage of areas that are alternatively obscured in the different potential configurations. In response to the evaluation of step 620 indicating that the configuration should be changed, the flow may continue to step 630, where the sensor management module 114 may modify the configuration of the adaptive sensing system 101, as disclosed herein.

The adaptive sensing system 101 may continue acquiring sensor data (and performing collision detection and/or avoidance actions) at step 610.

Figure 7:
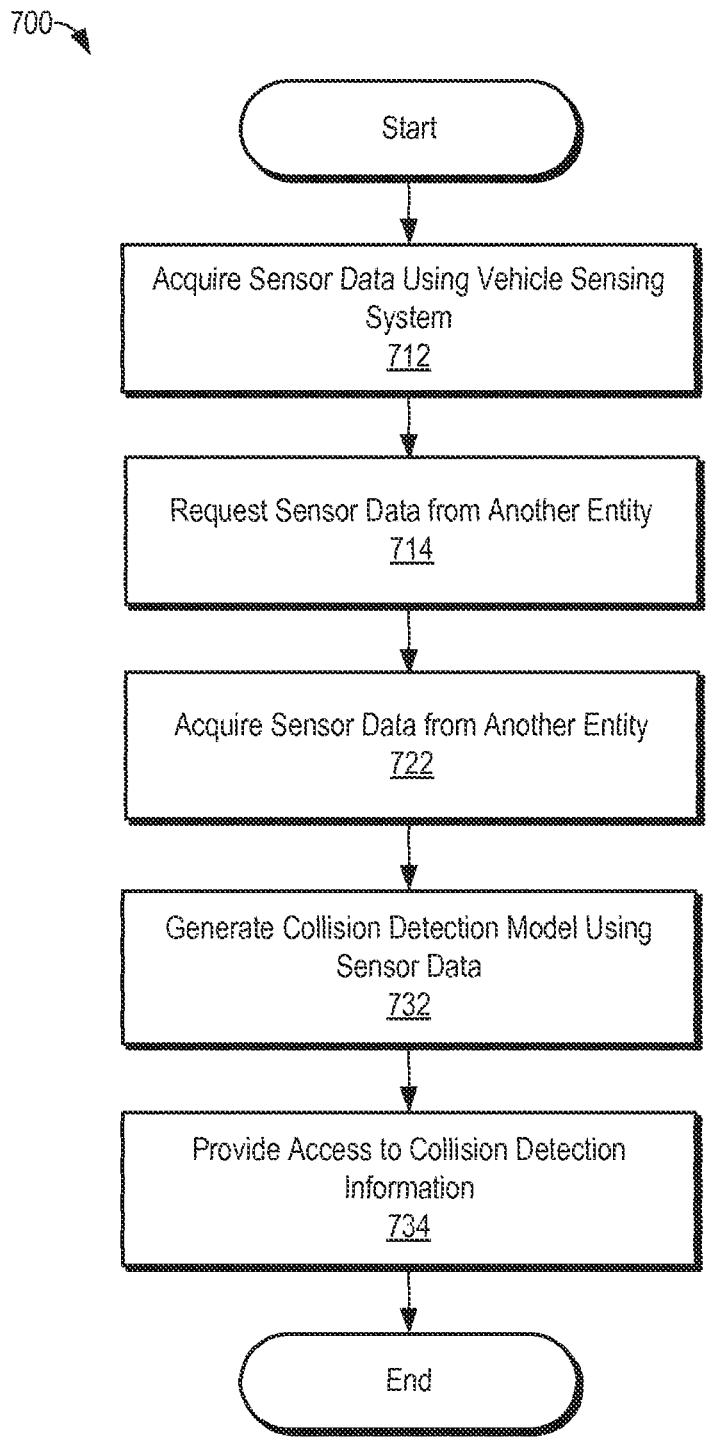
FIG. 7 is a flow diagram of another embodiment of a method for acquiring sensor data using an adaptive sensing system.

FIG. 7 is a flow diagram of another embodiment of a method 700 for acquiring sensor data using an adaptive sensing system 101. Step 712 may comprise acquiring sensor data using an adaptive sensing system 101. The sensor data of step 712 may be acquired using one or more different types of sensors 110, configured to operate in various different configurations, as disclosed herein.

Step 714 may comprise requesting sensor data from an external entity (e.g., another vehicle 103). The request of step 714 may be made in response to determining that the sensor data of step 712 fails to capture a particular area, fails to capture certain kinematic components of an object (e.g., a particular component Y 261 of object kinematics), determining that the adaptive sensing system 101 cannot be reconfigured to acquire certain sensor data, and/or the like. Alternatively, the request of step 714 may be made regardless of the nature of the sensor data acquired at step 712. The requested sensor data may be used to augment and/or refine the sensor data acquired at step 712 and/or sensor data acquired from other sources.

In some embodiments, the request of step 714 may be transmitted to a particular entity (e.g., a particular vehicle 103). Accordingly, step 714 may comprise establishing communication with the entity, which may comprise discovering the entity (e.g., via one or more broadcast messages), establishing a communication link with the entity, and so on. Alternatively, the request of step 714 may not be directed to any particular entity, but may be broadcast to any entity capable of providing sensor data.

The request may identify a particular area and/or object of interest. The area of interest may be specified relative to the vehicle 102 (the requester) and/or another frame of reference. Accordingly, step 714 may comprise translating information pertaining to the request into another coordinate system and/or frame of reference, as disclosed herein. Alternatively, or in addition, the request may identify an object of interest and/or request data acquired at a particular orientation and/or position with respect to an object.

In some embodiments, the request may comprise an offer in exchange for access to the sensor data. The offer may comprise a payment, bid, reciprocal access, collision detection data, or other consideration. Accordingly, in some embodiments, step 714 may comprise negotiating an acceptable exchange using one or more of: pre-determined policy, rules, thresholds, or the like. Step 714 may further comprise receiving acceptance from the requester, the source of the sensor data, and/or another entity (e.g., an association, insurer, or the like), as described above.

Step 722 may comprise acquiring the requested sensor data using the communication module 130, as described herein. Although method 700 depicts a request step 714, in some embodiments, the request step 714 may not be required. For example, in some embodiments, the sensor data may be made freely available (e.g., broadcast), such that the sensor data may be acquired at step 722 without an explicit request. Step 722 may comprise translating the acquired sensor data, as described above.

Step 732 may comprise generating a collision detection model 122 using the sensor data acquired using the adaptive sensing system 101 and/or the sensor data acquired from the other vehicle at step 722. Generating the collision detection model 122 may comprise fusing sensor data (e.g., combining the sensor data), determining object kinematics using the fused sensor data, and so on. Generating the collision detection model 122 may further comprise translating the collision detection model 122 into one or more suitable coordinate systems and/or frames of reference. Step 732 may further comprise detecting potential collisions using the collision detection model 122, which may comprise identifying objects involved in the potential collision, determining a time to the potential collision, determining collision avoidance actions and/or instructions, issuing one or more alerts and/or notifications, and so on.

Step 734 may comprise providing access to collision detection data to one or more other entities (e.g., the source of the sensor data acquired at step 722). Step 734 may comprise providing a portion of the collision detection model 122 generated at step 732 to one or more other vehicles, providing one or more collision detection alerts to other vehicles, providing sensor data to one or more other vehicles, and the like. Step 734 may comprise transmitting the collision detection data to a particular vehicle and/or broadcasting the collision detection data. The collision detection data may comprise auxiliary information, such as a position and/or kinematics of the vehicle 102, time information, and so on, which may allow recipients to translate the collision detection data into other coordinate systems and/or frames of reference. In some embodiments, step 734 may comprise providing monitoring data 272 to a network-accessible service 154, storing the monitoring data 272 on the computer-readable storage resources 113, and the like.

Although FIG. 7 depicts steps in a particular sequence, the disclosure is not limited in this regard; for example, the vehicle 102 may acquire sensor data using the adaptive sensing system 101 while concurrently receiving sensor data from another entity at step 722, generating the collision detection model 122 at step 732, and/or providing access to collision detection data at step 734.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. A method, comprising:
   detecting a first object that is at least partially obscured by a second object in first sensor data captured by a sensing system of a land vehicle, the sensing system comprising one or more sensor devices, including a particular sensor device configured to capture sensor data pertaining to a coverage area;
   modifying a configuration of the particular sensor device to acquire sensor data pertaining to the first object that is at least partially obscured by the second object, wherein modifying the configuration of the particular sensor device comprises modifying the coverage area of the sensor data the particular sensor device is configured to capture, the modified coverage area including an obscured portion of the first object; and
   acquiring second sensor data from the sensing system, the second sensor data comprising sensor data pertaining to the obscured portion of the first object captured by the particular sensor device in the modified configuration.

2. The method of claim 1, further comprising acquiring the first sensor data from the sensing system.

3. The method of claim 2, further comprising determining that the first object is at least partially obscured by the second object by use of the first sensor data.

4. The method of claim 3, determining that the first object is at least partially obscured by the second object in response to comparing kinematics of the first object and the second object by use of the first sensor data.

5. The method of claim 1, further comprising distinguishing, in the first sensor data, sensor data pertaining to the first object from sensor data pertaining to the second object.

6. The method of claim 1, further comprising distinguishing, in the first sensor data, sensor data pertaining to the first object from sensor data pertaining to the second object based on time-of-flight of the first sensor data.

7. The method of claim 1, further comprising distinguishing, in the first sensor data, sensor data pertaining to the first object from sensor data pertaining to the second object based on Doppler characteristics of the first sensor data.

8. The method of claim 1, further comprising distinguishing, in the first sensor data, sensor data pertaining to the first object from sensor data pertaining to the second object based on kinematics of the first object and the second object derived from the first sensor data.

9. The method of claim 1, further comprising distinguishing, in the first sensor data, sensor data pertaining to the first object from sensor data pertaining to the second object based on a differential position of the first object and the second object determined by use of the first sensor data.

10. The method of claim 1, wherein modifying the configuration of the particular sensor device comprises directing the particular sensor device to the first object.

11. The method of claim 1, wherein modifying the configuration of the particular sensor device comprises modifying a sensing signal generated by the particular sensor device.

12. The method of claim 11, wherein modifying the sensing signal comprises modifying a wavelength of the sensing signal.

13. The method of claim 11, wherein modifying the sensing signal comprises modifying a phase of the sensing signal.

14. The method of claim 11, wherein modifying the sensing signal comprises modifying a polarization of the sensing signal.

15. The method of claim 11, wherein modifying the sensing signal comprises modifying an amplitude of the sensing signal.

16. The method of claim 11, wherein modifying the sensing signal comprises modifying a power of the sensing signal.

17. The method of claim 10, wherein directing the particular sensor device to the first object comprises determining a signal path to the first object.

18. The method of claim 17, wherein the determined signal path passes through a portion of the second object.

19. The method of claim 18, further comprising configuring the sensing signal in accordance with the portion of the second object that the signal path is configured to pass through.

20. The method of claim 19, wherein configuring the sensing signal in accordance with the portion of the second object that the signal path is configured to pass through comprises configuring a phase of the sensing signal.

21. The method of claim 19, wherein configuring the sensing signal in accordance with the portion of the second object that the signal path is configured to pass through comprises configuring a frequency of the sensing signal.

22. The method of claim 19, wherein configuring the sensing signal in accordance with the portion of the second object that the signal path is configured to pass through comprises configuring a wavelength of the sensing signal.

23. The method of claim 19, wherein configuring the sensing signal in accordance with the portion of the second object that the signal path is configured to pass through comprises configuring an amplitude of the sensing signal.

24. The method of claim 19, wherein configuring the sensing signal in accordance with the portion of the second object that the signal path is configured to pass through comprises configuring a power of the sensing signal.

25. The method of claim 17, wherein determining the signal path comprises scanning portions of the second object.

26. The method of claim 25, further comprising scanning portions of the second object by use of the sensing system.

27. The method of claim 25, wherein determining the signal path further comprises determining reflectance of portions of the second object in response to scanning the second object.

28. The method of claim 25, wherein determining the signal path further comprises determining signal transmission through portions of the second object in response to scanning the second object.

29. The method of claim 25, wherein determining the signal path further comprises determining signal attenuation through portions of the second object in response to scanning the second object.

30. An apparatus, comprising:
a processing module configured to detect a first object that is at least partially obscured by a second object in first sensor data captured by a sensing system of a land vehicle, the sensing system comprising one or more sensor devices configured to capture sensor data pertaining to respective coverage regions;
a sensor management module configured to modify a configuration of a selected one of the one or more sensor devices to acquire sensor data pertaining to an obscured portion of the first object, wherein modifying the configuration of the selected sensor device comprises adapting the coverage region sensor data the selected sensor device is configured to capture to include the obscured portion of the first object; and
a data acquisition module configured to acquire sensor data pertaining to the first object by use of the one or more sensors in the modified configuration.

31. The apparatus of claim 30, wherein the data acquisition module is configured to acquire the first sensor data from the sensing system.

32. The apparatus of claim 30, wherein the sensor management module is configured to modify the configuration of the selected sensor device by directing the sensor device to the first object.

33. The apparatus of claim 32, wherein directing the selected sensor device to the first object comprises configuring the selected sensor device to direct a sensing signal around a third object to the first object.

34. The apparatus of claim 33, wherein the processing module is configured to determine a signal path from the selected sensor device to the obscured portion of the first object, and wherein the determined signal path contacts a portion of a third object detected in the first sensor data.

35. The apparatus of claim 30, wherein modifying the configuration of the selected sensor device comprises configuring the selected sensor device to direct a sensing signal to and/or from the first object by use of a third object.

36. The apparatus of claim 35, wherein the processing module is configured to determine a configuration of the third object.

37. The apparatus of claim 36, wherein determining the configuration of the third object comprises scanning the third object by use of the one or more sensors.

38. The apparatus of claim 36, wherein determining the configuration of the third object comprises acquiring an image of the third object.

39. The apparatus of claim 36, wherein the processing module is configured to determine a path on which to direct the sensing signal to and/or from the first object by use of the third object based on the determined configuration of the third object.

40. The apparatus of claim 35, wherein the processing module is configured to determine kinematics of the third object relative to the land vehicle by use of sensor data acquired by use of the one or more sensors.

41. The apparatus of claim 40, wherein the processing module is configured to determine a path on which to direct the sensing signal to and/or from the first object by use of the third object based on the determined kinematics of the third object relative to the land vehicle.

42. The apparatus of claim 35, wherein the sensor management module is configured to configure the sensing signal generated by the selected sensing device in response to properties of the third object.

43. The apparatus of claim 42, wherein the sensor management module is configured to configure one or more of a phase, frequency, wavelength, polarization, amplitude, and power of the sensing signal generated by the selected sensor device in response to properties of the third object.

44. The apparatus of claim 35, wherein the processing module is configured to estimate a signal attenuation of a signal path between the one or more sensors and the first object.

* * * * *